United States Patent
Nagaosa

(10) Patent No.: US 10,556,494 B2
(45) Date of Patent: Feb. 11, 2020

(54) AIR-COOLED FUEL CELL VEHICLE

(71) Applicant: TOYOTA JIDOSHA KABUSHIKI KAISHA, Toyota-shi, Aichi-ken (JP)

(72) Inventor: Hideo Nagaosa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 194 days.

(21) Appl. No.: 15/613,529

(22) Filed: Jun. 5, 2017

(65) Prior Publication Data

US 2017/0349040 A1    Dec. 7, 2017

(30) Foreign Application Priority Data

Jun. 6, 2016   (JP) ................. 2016-113040

(51) Int. Cl.
| | | |
|---|---|---|
| *B60K 1/04* | (2019.01) | |
| *B60K 11/08* | (2006.01) | |
| *H01M 8/04746* | (2016.01) | |
| *B60L 50/50* | (2019.01) | |
| *B60K 11/06* | (2006.01) | |
| *B60K 13/04* | (2006.01) | |
| *H01M 8/1018* | (2016.01) | |
| *H01M 8/04* | (2016.01) | |

(52) U.S. Cl.
CPC ............... *B60K 1/04* (2013.01); *B60K 11/06* (2013.01); *B60K 11/08* (2013.01); *B60K 13/04* (2013.01); *B60L 50/50* (2019.02); *H01M 8/04753* (2013.01); *H01M 8/04776* (2013.01); *H01M 8/04* (2013.01); *H01M 2008/1095* (2013.01); *H01M 2250/20* (2013.01); *Y02T 90/32* (2013.01)

(58) Field of Classification Search
CPC ....... B60K 11/06; B60K 11/08; B60K 11/085; B60K 13/04
See application file for complete search history.

(56) References Cited

U.S. PATENT DOCUMENTS

| | | | | |
|---|---|---|---|---|
| 3,506,082 A | * | 4/1970 | Cadiou ................. | B60K 11/04 180/68.1 |
| 5,205,484 A | * | 4/1993 | Susa .................... | B60H 1/3227 123/41.04 |
| 6,988,574 B2 | * | 1/2006 | Jones ................... | B60K 11/08 180/68.1 |
| 7,770,679 B2 | * | 8/2010 | Takaku ................. | B60K 1/04 180/68.5 |
| 7,900,727 B2 | * | 3/2011 | Shinmura .............. | B60K 1/04 180/68.1 |
| 8,017,278 B2 | * | 9/2011 | Yoshida ............. | B60H 1/00392 180/65.31 |
| 8,029,343 B2 | * | 10/2011 | Major ................ | B60H 1/00278 454/70 |

(Continued)

FOREIGN PATENT DOCUMENTS

| | | | | |
|---|---|---|---|---|
| CN | 102892610 A | | 1/2013 | |
| DE | 102012018875 A1 | * | 3/2014 | ........ H01M 8/04089 |

(Continued)

*Primary Examiner* — Katy M Ebner

(74) *Attorney, Agent, or Firm* — Dickinson Wright, PLLC

(57) ABSTRACT

When it is determined that the vehicle is stopped, a control unit blocks communication between a first opening and a fuel cell by a first valve. When a fan is being driven and communication between the first opening and the fuel cell is blocked by the first valve, a second valve opens a third opening.

13 Claims, 10 Drawing Sheets

(56) References Cited

U.S. PATENT DOCUMENTS

| | | | | |
|---|---|---|---|---|
| 8,465,350 B2 * | 6/2013 | Kilian | ............... | B60H 1/00492 429/433 |
| 8,824,876 B2 * | 9/2014 | Ohtsuka | ............... | B60K 1/04 392/465 |
| 8,863,871 B2 * | 10/2014 | Kobayashi | ............... | H01M 8/0662 180/65.31 |
| 9,016,413 B2 * | 4/2015 | Ikeya | ............... | B60K 1/04 180/68.2 |
| 9,281,533 B2 * | 3/2016 | Ozawa | ............... | B60K 1/04 |
| 9,616,731 B2 * | 4/2017 | Koberstein | ............... | B60H 1/249 |
| 9,705,140 B2 * | 7/2017 | Matsumoto | ............... | B60L 50/72 |
| 10,179,509 B2 * | 1/2019 | Maeda | ............... | B60K 11/06 |
| 10,202,049 B2 * | 2/2019 | Nagaosa | ............... | B60H 1/3229 |
| 2003/0183432 A1 * | 10/2003 | Suzuki | ............... | B60K 11/08 180/68.1 |
| 2005/0138941 A1 * | 6/2005 | Kikuchi | ............... | B60H 1/00278 62/178 |
| 2010/0297514 A1 | 11/2010 | Jufuku et al. | | |
| 2013/0094842 A1 | 4/2013 | Ohtsuka et al. | | |
| 2013/0303070 A1 * | 11/2013 | Ozawa | ............... | H01M 8/04089 454/151 |
| 2013/0333964 A1 * | 12/2013 | Matsumoto | ............... | H01M 8/04201 180/65.31 |
| 2014/0186732 A1 | 7/2014 | Tachibana et al. | | |
| 2014/0335434 A1 * | 11/2014 | Ikeya | ............... | B60L 1/003 429/435 |
| 2017/0284275 A1 * | 10/2017 | Nam | ............... | B60H 1/3211 |
| 2017/0349040 A1 * | 12/2017 | Nagaosa | ............... | B60L 50/50 |
| 2018/0354558 A1 * | 12/2018 | Otsura | ............... | B60K 13/04 |
| 2019/0070974 A1 * | 3/2019 | Uetake | ............... | B60K 11/06 |

FOREIGN PATENT DOCUMENTS

| | | |
|---|---|---|
| JP | 2004-129433 A | 4/2004 |
| JP | 2008-137571 A | 6/2008 |
| JP | 2012-205330 A | 10/2012 |
| JP | 2012205330 A * | 10/2012 |
| JP | 2013-049350 A | 3/2013 |

* cited by examiner

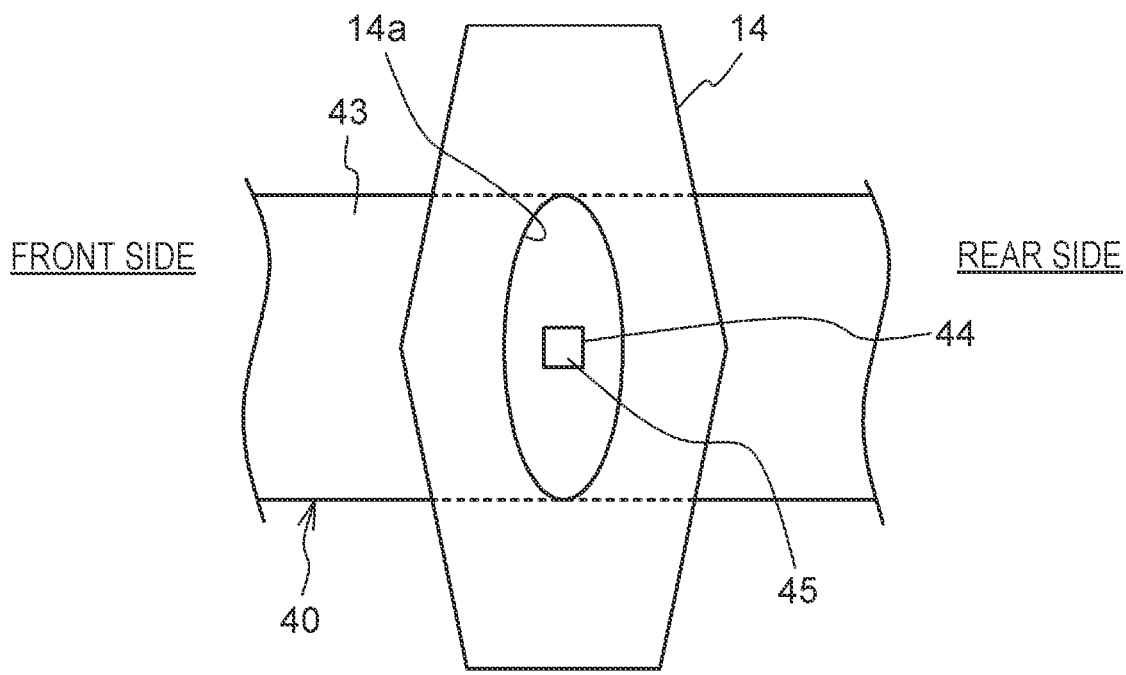

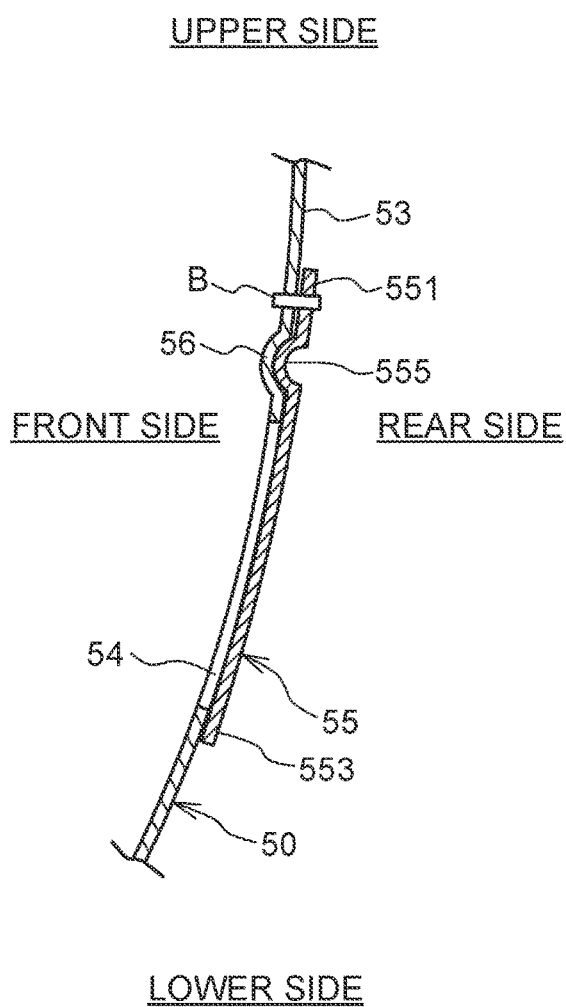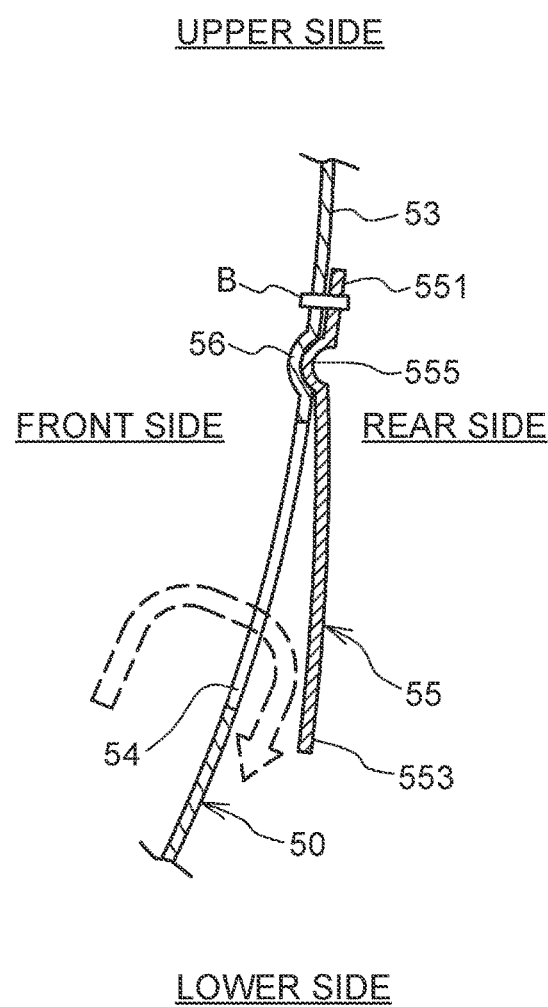

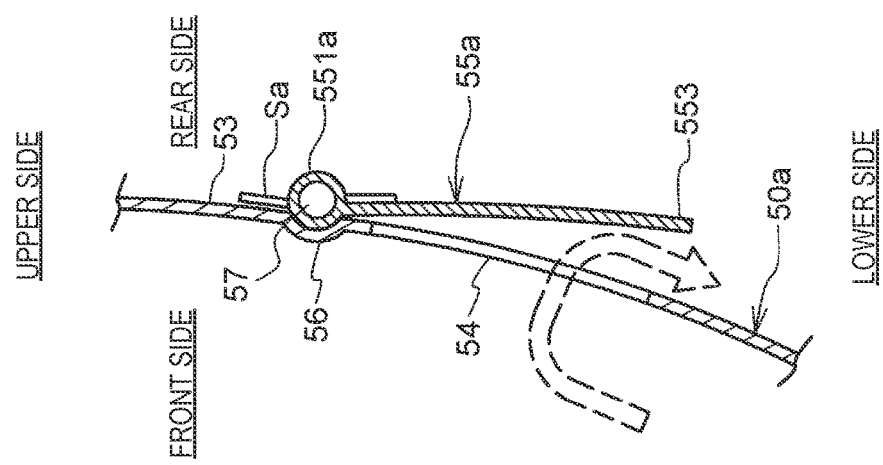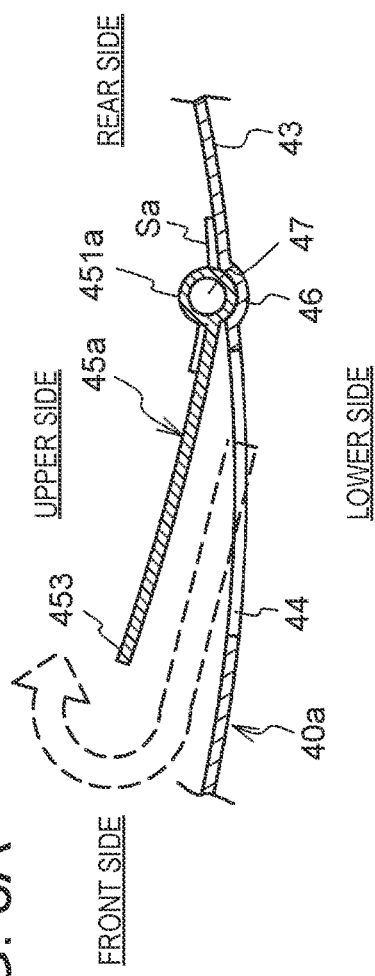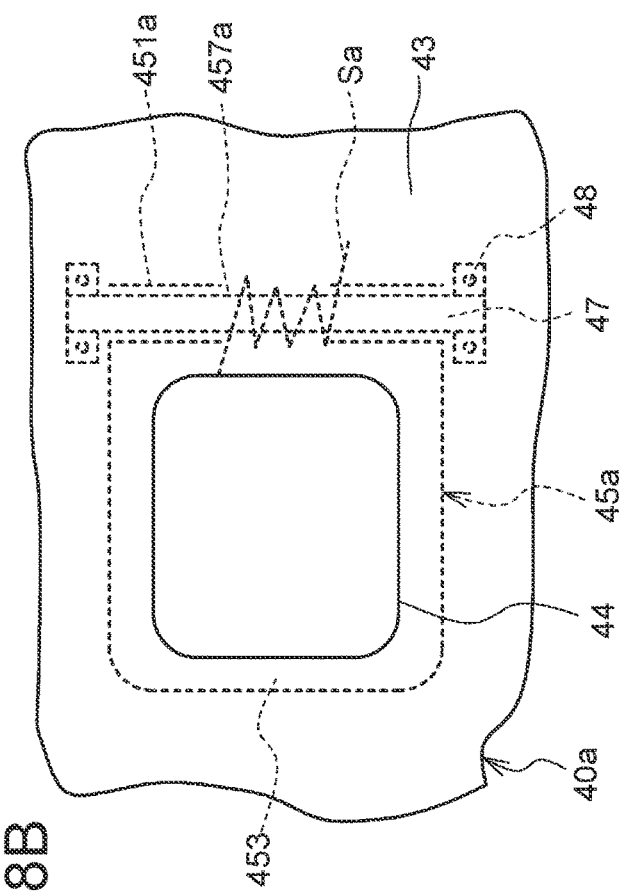

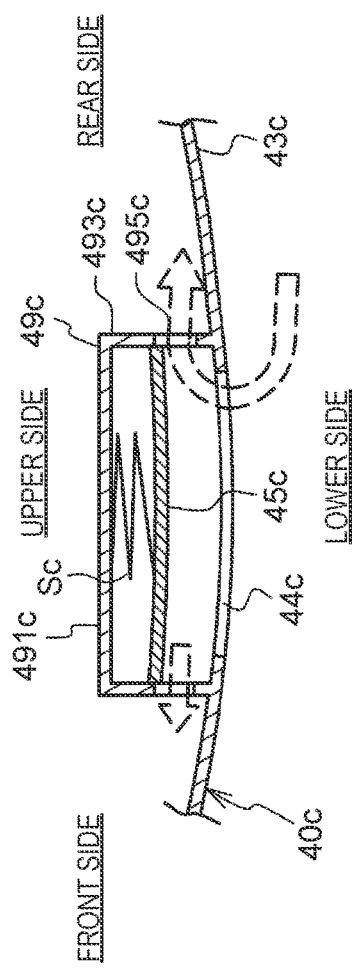
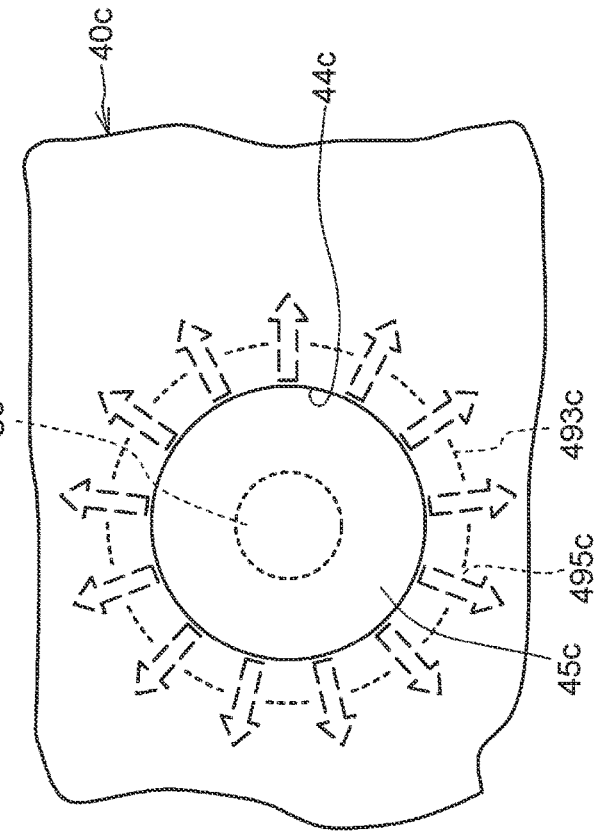
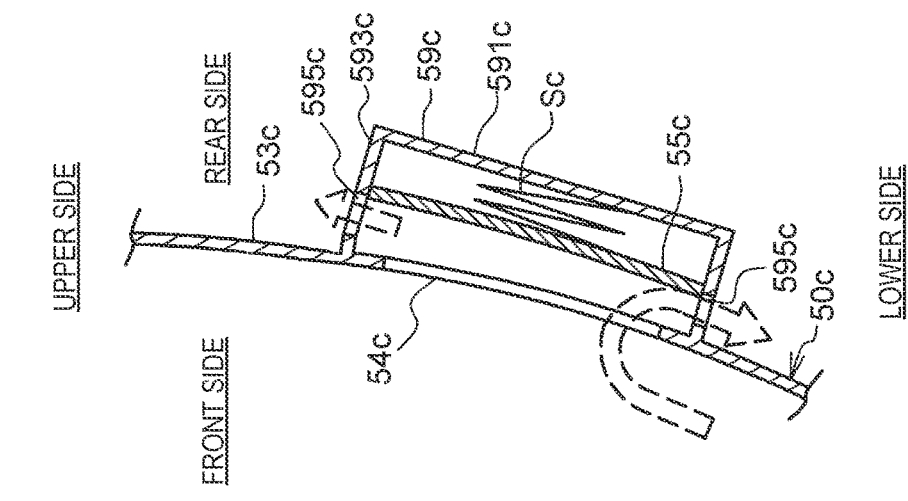

AIR-COOLED FUEL CELL VEHICLE

INCORPORATION BY REFERENCE

The disclosure of Japanese Patent Application No. 2016-113040 filed on Jun. 6, 2016 including the specification, drawings and abstract is incorporated herein by reference in its entirety.

BACKGROUND OF THE INVENTION

1. Technical Field

The present disclosure relates to an air-cooled fuel cell vehicle.

2. Description of Related Art

A fuel cell vehicle is known in which electric power supplied to a traction motor is derived from electric power generated by a fuel cell. An exhaust pipe through which air is discharged to the outside of the vehicle is connected to this fuel cell. To prevent water from entering the exhaust pipe, for example, Japanese Patent Application Publication No. 2012-205330 proposes a technique of closing a valve provided in the exhaust pipe when the fuel cell is not generating electric power.

SUMMARY

Fuel cells include an air-cooled fuel cell that uses air not only for generating electric power but also as a coolant, and this type of fuel cell requires a larger amount of air than a water-cooled type. In a vehicle equipped with an air-cooled fuel cell, therefore, a duct is disposed so as to connect a ventilation port formed in a body to the fuel cell housed inside the body, and air is circulated through this duct by a fan to supply a large amount of air to the air-cooled fuel cell.

For example, such an air-cooled fuel cell vehicle may be washed with high-pressure water while the vehicle is stopped. In this situation, water may enter the duct through the ventilation port of the body and reach the fuel cell, affecting the fuel cell in some way. Here, providing a valve in the duct and closing this valve as in the technique of JP 2012-205330 A can reduce such risk.

However, even when the vehicle is stopped, the fuel cell may be generating electric power, or even when the vehicle is stopped and the fuel cell is not generating electric power, the fuel cell may be being cooled with air, and in such cases it is necessary to secure the supply of air to the fuel cell. Closing the valve provided in the duct then would disrupt the supply of air to the fuel cell, and thus may hinder the fuel cell from generating electric power or being cooled.

The present disclosure provides an air-cooled fuel cell vehicle that can supply air to an air-cooled fuel cell while keeping water from reaching the air-cooled fuel cell through a duct while the vehicle is stopped.

A first aspect of the present disclosure relate to an air-cooled fuel cell vehicle equipped with an air-cooled fuel cell. The air-cooled fuel cell vehicle includes: a traction motor that is supplied with electric power generated by the fuel cell; a duct that has a first opening, a second opening facing the fuel cell, and a peripheral wall connecting the first opening to the second opening; a fan that circulates air through the duct; a first valve that allows or blocks communication between the first opening and the fuel cell; a body that has a ventilation port facing the first opening, and houses the fuel cell, the duct, the fan, and the first valve; a stop determination unit that determines whether the vehicle is stopped; and a control unit that controls the first valve. The peripheral wall is provided with a third opening at a position between the first valve and the fuel cell, farther away from the ventilation port than the first opening is, and with a second valve that opens and closes the third opening. The third opening, the fuel cell, and the fan, or the third opening, the fan, and the fuel cell, are arranged in this order in a direction from the first opening toward the second opening. When it is determined that the vehicle is stopped, the control unit blocks communication between the first opening and the fuel cell by the first valve. When the fan is being driven and communication between the first opening and the fuel cell is blocked by the first valve, the second valve opens the third opening.

The second valve opens the third opening as communication between the first opening and the fuel cell is blocked by the first valve and the fan is driven while the vehicle is stopped. With communication between the first opening and the fuel cell thus blocked, water can be kept from entering the duct through the ventilation port and reaching the fuel cell even while the vehicle is washed. Moreover, as the third opening is opened, air inside and outside the duct is circulated by the fan through the third opening, so that the supply of air to the fuel cell can be secured. Since the third opening is farther away from the ventilation port than the first opening is, water having entered the body through the ventilation port is kept from reaching the fuel cell through the third opening.

The body may include, as the ventilation port, a ventilation outlet through which air is discharged from the body. The duct may include an exhaust duct that guides air, discharged from the fuel cell, to the ventilation outlet. The duct may include a first exhaust outlet as the first opening. The duct may include an exhaust inlet as the second opening. The first valve may include a first exhaust valve that allows or blocks communication between the first exhaust outlet and the fuel cell. The peripheral wall of the exhaust duct may be provided with a second exhaust outlet as the third opening. The second valve may include a second exhaust valve that opens and closes the second exhaust outlet.

The body may include, as the ventilation port, a ventilation inlet through which air is introduced into the body. The ventilation inlet may be located on the front side of the vehicle. The second exhaust outlet may be provided on the side of the peripheral wall of the exhaust duct that is closer to the rear side of the vehicle.

The air-cooled fuel cell vehicle may further include: a fan driving determination unit that determines whether the fan is being driven; and an air flow rate determination unit that determines whether a value of a parameter correlated with a flow rate of air supplied to the fuel cell indicates a flow rate of the air at or below a threshold value. The ventilation outlet may be provided in an upper surface of the body. When it is determined that the vehicle is not stopped, that the fan is being driven, and that the value of the parameter indicates a flow rate of the air at or below the threshold value, the control unit may block communication between the first exhaust outlet and the fuel cell by the first exhaust valve.

The second exhaust valve may be disposed on the outer surface side of the exhaust duct. The second exhaust valve may close the second exhaust outlet by an elastic restoring force of the second exhaust valve itself or by an urging force applied from the outside to the second exhaust valve. When the pressure inside the exhaust duct becomes a pressure which is higher than the pressure outside the exhaust duct by a predetermined value or more, the second exhaust valve may open the second exhaust outlet against the elastic restoring force or the urging force.

The second exhaust valve may have a base end part that is supported on the outer surface side of the exhaust duct, and a leading end part that is a free end located on the lower side relative to the base end part.

The body may include, as the ventilation port, a ventilation inlet through which air is introduced into the body. The duct may include an intake duct that guides air, introduced into the body through the ventilation inlet, to the fuel cell. The duct may include a first intake inlet as the first opening. The duct may include an intake outlet as the second opening. The first valve may include a first intake valve that allows or blocks communication between the first intake inlet and the fuel cell. The peripheral wall of the intake duct may be provided with a second intake inlet as the third opening. The second valve may include a second intake valve that opens and closes the second intake inlet.

The second intake inlet may be located on the lower side of the intake duct.

The motor, or a transaxle that transmits power of the motor to wheels, may be disposed on the lower side of the second intake inlet.

The second intake valve may be disposed on the inner surface side of the intake duct. The second intake valve may close the second intake inlet by an elastic restoring force of the second intake valve itself or by an urging force applied from the outside to the second intake valve. When the pressure inside the intake duct becomes a pressure which is a pressure which is lower than the pressure outside the intake duct by a predetermined value, the second intake valve may open the second intake inlet against the elastic restoring force or the urging force.

The second intake valve may have a base end part that is supported on the inner surface side of the intake duct, and a leading end part that is a free end located on the front side of the vehicle relative to the base end part.

The open area of the third opening may be smaller than the open area of the first opening of the duct.

A second aspect of the present disclosure relates to an air-cooled fuel cell vehicle equipped with an air-cooled fuel cell. The air-cooled fuel cell vehicle comprises: a traction motor that is supplied with electric power generated by the fuel cell; a duct that has a first opening, a second opening facing the fuel cell, and a peripheral wall connecting the first opening to the second opening; a fan that circulates air through the duct; a first valve that allows or blocks communication between the first opening and the fuel cell; a body that has a ventilation port facing the first opening, and houses the fuel cell, the duct, the fan, and the first valve; and an electronic control unit programmed to determine whether the vehicle is stopped and to control the first valve. The peripheral wall is provided with a third opening at a position between the first valve and the fuel cell, farther away from the ventilation port than the first opening is, and with a second valve that opens and closes the third opening. The third opening, the fuel cell, and the fan, or the third opening, the fan, and the fuel cell, are arranged in this order in a direction from the first opening toward the second opening. When it is determined that the vehicle is stopped, the electronic control unit is programmed to drive the first valve so as to block communication between the first opening and the fuel cell. When the fan is being driven and communication between the first opening and the fuel cell is blocked by the first valve, the second valve opens the third opening.

According to the present disclosure, it is possible to provide an air-cooled fuel cell vehicle that can supply air to the air-cooled fuel cell while keeping water from reaching the air-cooled fuel cell through the duct while the vehicle is stopped.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a view of an intake duct and a cross-member located on the lower side of the intake duct as seen from the lower side;

FIG. 4A is a sectional view around an exhaust reed valve in a closed state;

FIG. 4B is a sectional view around the exhaust reed valve in an open state;

FIG. 8A is a sectional view around an intake flap valve of a modified example in an open state;

FIG. 8B is a view around the intake flap valve of the modified example in a closed state as seen from the lower side;

FIG. 8C is a sectional view around an exhaust flap valve of the modified example in an open state;

FIG. 10A is a sectional view around an intake lift valve of a modified example in an open state;

FIG. 10B is a view around the intake lift valve of the modified example in a closed state as seen from the lower side; and FIG. 10C is a sectional view around an exhaust lift valve of the modified example in an open state.

DETAILED DESCRIPTION OF EMBODIMENTS

Figure 1:
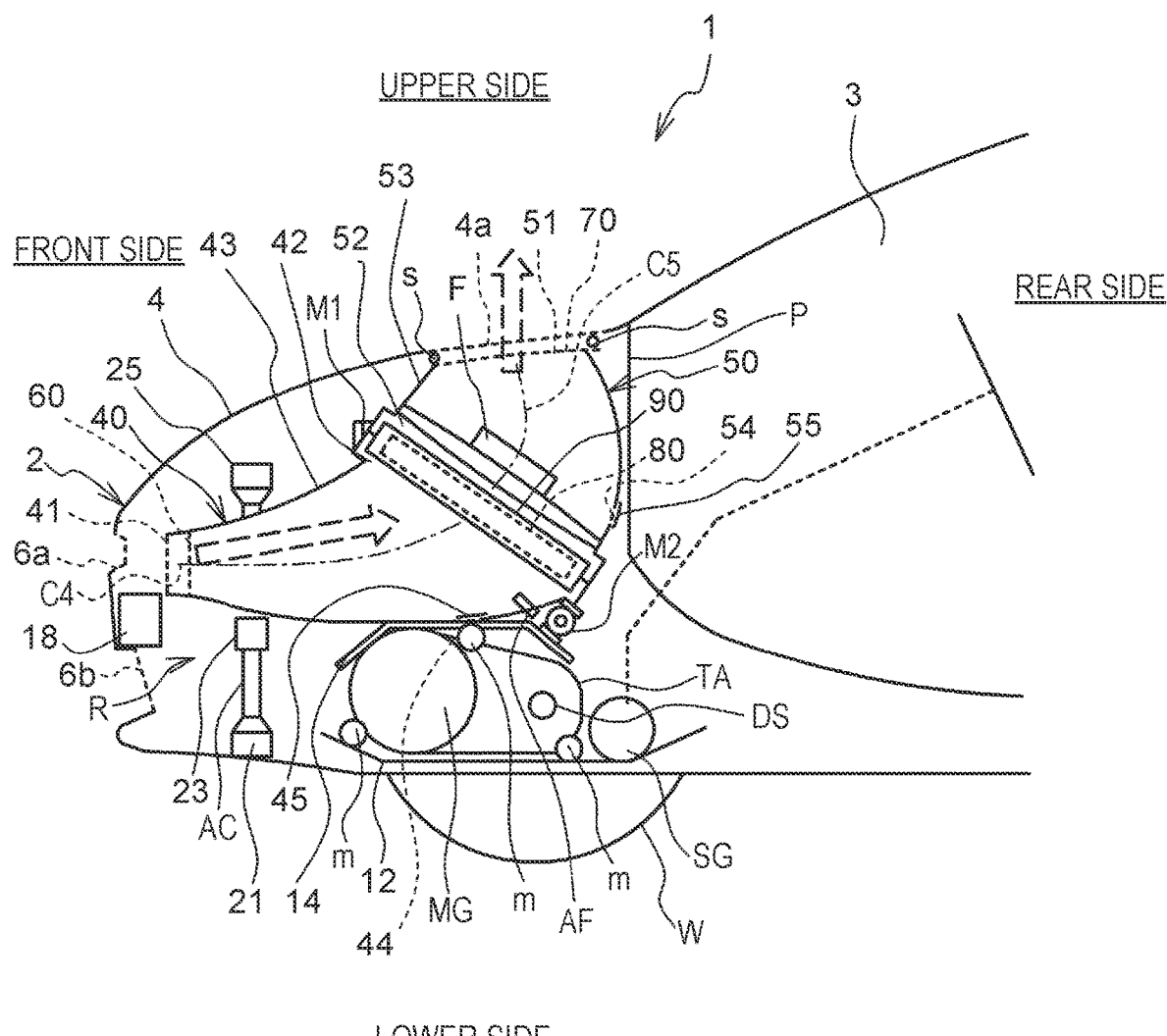
FIG. 1 is a schematic view of an internal structure of the front side of a vehicle.

An air-cooled fuel cell vehicle 1 (hereinafter referred to as a vehicle) of this embodiment will be described. FIG. 1 is a schematic view of the internal structure of the front side of the vehicle 1 as seen from one side. In this specification, the front side and the rear side refer respectively to the front side and the rear side of the vehicle 1 in a front-rear direction orthogonal to a vehicle width direction, while the upper side and the lower side refer respectively to the vertically upper side and the vertically lower side of the vehicle 1.

Inside a body 2 of the vehicle 1, a storage room R is provided on the front side relative to a dashboard panel P that defines an occupant compartment 3. A front hood 4 that opens and closes the upper side of the storage room R is provided on the front side of the body 2. The storage room R houses a motor MG, a transaxle TA, an air-cooled fuel cell stack (hereinafter referred to as a fuel cell) 80, a holder frame 90, an intake duct 40, an exhaust duct 50, an intake shutter valve 60, and an exhaust shutter valve 70. A tank that stores hydrogen to be supplied to the fuel cell 80, a secondary battery that can supply electric power to the motor MG, etc. are housed in a space of the vehicle 1 other than the storage room R.

The motor MG is a traction motor of the vehicle 1, and is driven as electric power generated by the fuel cell 80 is supplied thereto. The motor MG is of a three-phase alternating-current type, but is not limited to this example. The transaxle TA is formed integrally with the motor MG, and transmits power of the motor MG to a drive shaft DS that extends in the vehicle width direction, and thereby drives front wheels W coupled to the drive shaft DS. The transaxle TA is a power transmission mechanism including a reduction gear and a differential gear. The motor MG and the transaxle TA are disposed side by side in the vehicle width direction. The vehicle 1 is a front-wheel-drive vehicle, but is not limited to this example. For example, the vehicle 1 may instead be a rear-wheel-drive vehicle or an all-wheel-drive vehicle, and the motor MG and the transaxle TA may be disposed inside the storage room R or may be disposed on the rear side of the vehicle 1.

The motor MG and the transaxle TA are supported through a mount mechanism m between a front suspension member (hereinafter referred to as a suspension member) 12 and a front cross-member (hereinafter referred to as a cross-member) 14. The suspension member 12 is suspended from a pair of front side members (not shown) through an insulator (not shown), and supports the motor MG, the transaxle TA, and a steering gear SG from the lower side. The pair of front side members is provided in a lower part of the storage room R, one on each side in the vehicle width direction.

The cross-member 14 couples together the pair of front side members by extending in the vehicle width direction, and is located on the upper side relative to the motor MG and the transaxle TA and on the lower side relative to the intake duct 40.

The fuel cell 80 is a polymer electrolyte fuel cell that generates electric power as hydrogen and oxygen that are reactant gases are supplied thereto, and is of an air-cooled type that is cooled with air, not a liquid. The fuel cell 80 has a substantially rectangular shape with a predetermined thickness, and a peripheral edge of the fuel cell 80 is covered by the holder frame 90.

The intake duct 40 is disposed on the front side of the fuel cell 80. The intake duct 40 has a tubular shape and is made of metal, but may instead be made of resin. The intake duct 40 is an example of a duct that has a first intake inlet 41, an intake outlet 42 facing the fuel cell 80, and a peripheral wall 43 connecting the first intake inlet 41 to the intake outlet 42. The first intake inlet 41 is an example of a first opening. The intake outlet 42 is an example of a second opening facing the fuel cell 80. The first intake inlet 41 is located on the front side, and the intake outlet 42 is located on the rear side. The first intake inlet 41 faces a ventilation inlet 6a that is formed in a part of the body 2 on the upper side relative to a front bumper reinforcement 18. Air is circulated through the intake duct 40 as a fan F to be described later is driven, and thus the air is guided from the first intake inlet 41 to the fuel cell 80. Accordingly, it is possible to efficiently guide the air, taken in from the outside of the vehicle 1 through the ventilation inlet 6a, to the fuel cell 80, and to ensure that air is supplied to the fuel cell 80 at a certain flow rate. In FIG. 1, a central axis C4 of the intake duct 40 is indicated.

The exhaust duct 50 is disposed on the rear side of the fuel cell 80. The exhaust duct 50 has a tubular shape and is made of metal, but may instead be made of resin. The exhaust duct 50 is an example of a duct that has a first exhaust outlet 51, an exhaust inlet 52 facing the fuel cell 80, and a peripheral wall 53 connecting the first exhaust outlet 51 to the exhaust inlet 52. The first exhaust outlet 51 is an example of a first opening. The exhaust inlet 52 is an example of a second opening facing the fuel cell 80. The first exhaust outlet 51 is located on the upper side, and the exhaust inlet 52 is located on the lower side. The first exhaust outlet 51 faces a ventilation outlet 4a formed in the front hood 4 of the body 2. Thus, the exhaust duct 50 extends upward from the fuel cell 80. As the fan F is driven, air having passed through the fuel cell 80 flows through the exhaust duct 50. This air is guided toward the first exhaust outlet 51 on the upper side relative to the fuel cell 80, and is discharged to the outside of the vehicle 1 through the ventilation outlet 4a. Thus, air at a high flow rate having passed through the fuel cell 80 can be appropriately discharged to the outside of the vehicle 1. In FIG. 1, a central axis C5 of the exhaust duct 50 is indicated.

The holder frame 90 is fixed with bolts etc. on the side of the intake outlet 42 of the intake duct 40 and on the side of the exhaust inlet 52 of the exhaust duct 50. Thus, the fuel cell 80 is held so that a thickness direction of the fuel cell 80 coincides with a direction in which air flows through the intake duct 40 and the exhaust duct 50. The holder frame 90 has a frame shape that covers the peripheral edge of the fuel cell 80, as mentioned above, while exposing the side of the fuel cell 80 facing the intake duct 40 and the side thereof facing the exhaust duct 50 so as to allow passage of air through the fuel cell 80. The holder frame 90 is fixed to a vehicle frame member through mount mechanisms M1, M2. Specifically, with the mount mechanism M1, the holder frame 90 is fixed to an apron upper member that is located on the upper side of the left and right side members of the vehicle 1 and extends from the front side toward the rear side of the vehicle 1, and with the mount mechanism M2, the holder frame 90 is fixed to the rear side of the cross-member 14.

The fan F that passes air through the fuel cell 80 is disposed inside the exhaust duct 50. The fan F is disposed on the downstream side relative to the fuel cell 80, and suctions air from the intake duct 40 and discharges the air toward the exhaust duct 50. As the air thus passes through the fuel cell 80, oxygen to be used to generate electric power is supplied to the fuel cell 80 and the fuel cell 80 is cooled at the same time. In FIG. 1, the arrows indicate a direction in which air flows inside the intake duct 40 toward the fuel cell 80 and a direction in which air is discharged from the exhaust duct 50.

The first intake inlet 41 of the intake duct 40 and the first exhaust outlet 51 of the exhaust duct 50 are each provided with a wire mesh that keeps foreign substances from entering these ducts from the outside. Since the first intake inlet 41 of the intake duct 40 is located on the upper side, not the lower side, relative to the front bumper reinforcement 18, for example, water and sand are kept from entering the intake duct 40 from a road surface while the vehicle 1 is traveling. A seal member s that prevents air leakage through a gap between a periphery of the ventilation outlet 4a and a periphery of the first exhaust outlet 51 is provided on the inner surface side of the front hood 4. The seal member s is made of rubber or sponge, for example.

An intake shutter valve 60 that allows or blocks communication between the first intake inlet 41 and the fuel cell 80 is disposed between the first intake inlet 41 and the intake outlet 42 of the intake duct 40. Thus, the intake shutter valve 60 is an example of a first intake valve as well as of a first valve that allows or blocks communication between the first intake inlet 41 and the fuel cell 80. The peripheral wall 43 of the intake duct 40 is provided with a second intake inlet 44 at a position on the lower side facing the cross-member 14, and an intake reed valve 45 that is an example of a second intake valve that opens and closes the second intake inlet 44. Moreover, an air flowmeter AF that detects the flow rate of air supplied to the fuel cell 80 is disposed near the second intake inlet 44 and the intake reed valve 45. An exhaust shutter valve 70 that allows or blocks communication between the first exhaust outlet 51 and the fuel cell 80 is disposed on the side of the first exhaust outlet 51 of the exhaust duct 50. Thus, the exhaust shutter valve 70 is an example of a first exhaust valve as well as of a first valve that allows or blocks communication between the first exhaust outlet 51 and the fuel cell 80. The peripheral wall 53 of the exhaust duct 50 is provided with a second exhaust outlet 54 that is formed at a position facing the dashboard panel P, and an exhaust reed valve 55 that is an example of a second exhaust valve that opens and closes the second exhaust outlet 54. These members will be described in detail later.

The storage room R houses an air conditioner condenser AC below the intake duct 40. The body 2 has a ventilation inlet 6b on the lower side relative to the front bumper reinforcement 18 and on the front side relative to the air conditioner condenser AC. The air conditioner condenser AC releases heat of an air conditioner refrigerant by exchanging heat between the air conditioner refrigerant and air flowing into the storage room R through the ventilation inlet 6b.

The air conditioner condenser AC is disposed on the lower side of the intake duct 40. The air conditioner condenser AC is supported at the lower side and the upper side respectively by a support lower member 21 and a support member 23 extending in the vehicle width direction. The intake duct 40 is supported at the lower side and the upper side respectively by the support member 23 and a support upper member 25. The support member 23 and the support upper member 25 are supported by a pillar member (not shown) fixed to the support lower member 21.

However, the positional relation between the intake duct 40 and the air conditioner condenser AC is not limited to the above example. For example, the air conditioner condenser AC and the intake duct 40 may be disposed side by side in the vehicle width direction. Alternatively, the air conditioner condenser AC may be disposed on the upper side of the intake duct 40; the air conditioner condenser AC may face the ventilation inlet 6a; and the first intake inlet 41 of the intake duct 40 may face the ventilation inlet 6b.

The structures of the intake shutter valve 60 and the exhaust shutter valve 70 will be briefly described. The intake shutter valve 60 and the exhaust shutter valve 70 are basically kept open while the vehicle 1 is traveling, and are closed while the vehicle 1 is stopped. The intake shutter valve 60 has a plurality of fins, and allows or blocks communication between the first intake inlet 41 and the fuel cell 80 as these fins are rotated by a motor. With the same configuration, the exhaust shutter valve 70 allows or blocks communication between the first exhaust outlet 51 and the fuel cell 80. At least one of the intake shutter valve 60 and the exhaust shutter valve 70 may be a butterfly valve.

Next, the second intake inlet 44, the intake reed valve 45, the second exhaust outlet 54, and the exhaust reed valve 55 will be described. First, the position of the second intake inlet 44 will be described. The second intake inlet 44, the fuel cell 80, and the fan F are arranged in this order in a direction from the first intake inlet 41 toward the intake outlet 42 of the intake duct 40. This is to suction air into the intake duct 40 through the second intake inlet 44 when the intake shutter valve 60 is closed while the fan F is being driven. The second exhaust outlet 54, the fan F, and the fuel cell 80 are arranged in this order in a direction from the first exhaust outlet 51 toward the exhaust inlet 52 of the exhaust duct 50. This is to discharge air from the exhaust duct 50 to the outside through the second exhaust outlet 54 when the exhaust shutter valve 70 is closed while the fan F is being driven.

FIG. 2 is a view of the intake duct 40 and the cross-member 14 located on the lower side of the intake duct 40 as seen from the lower side. The cross-member 14 has an opening 14a in a center part, and the second intake inlet 44 is located inside the opening 14a. Thus, as will be described in detail later, as the intake reed valve 45 opens the second intake inlet 44, air can be introduced from the outside of the intake duct 40 into the intake duct 40 through the second intake inlet 44 without being hindered by the cross-member 14.

Figure 3A:
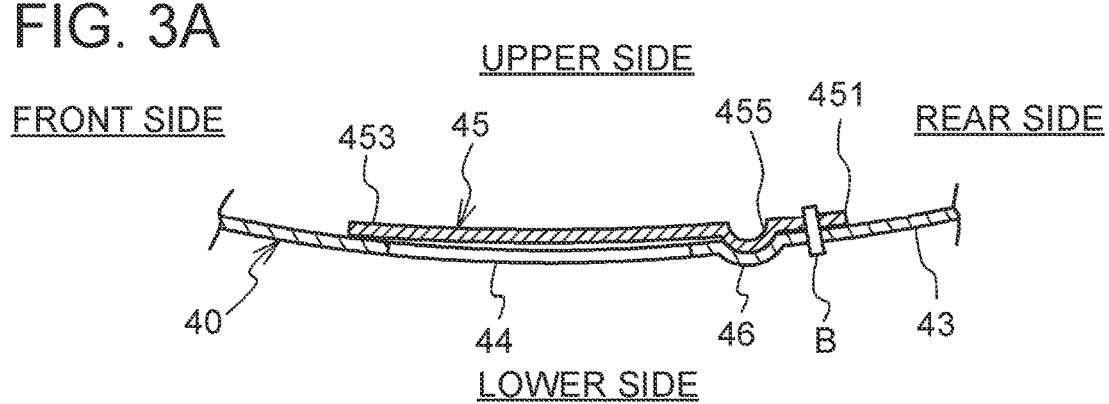
FIG. 3A is a sectional view around an intake reed valve in a closed state.
Figure 3B:
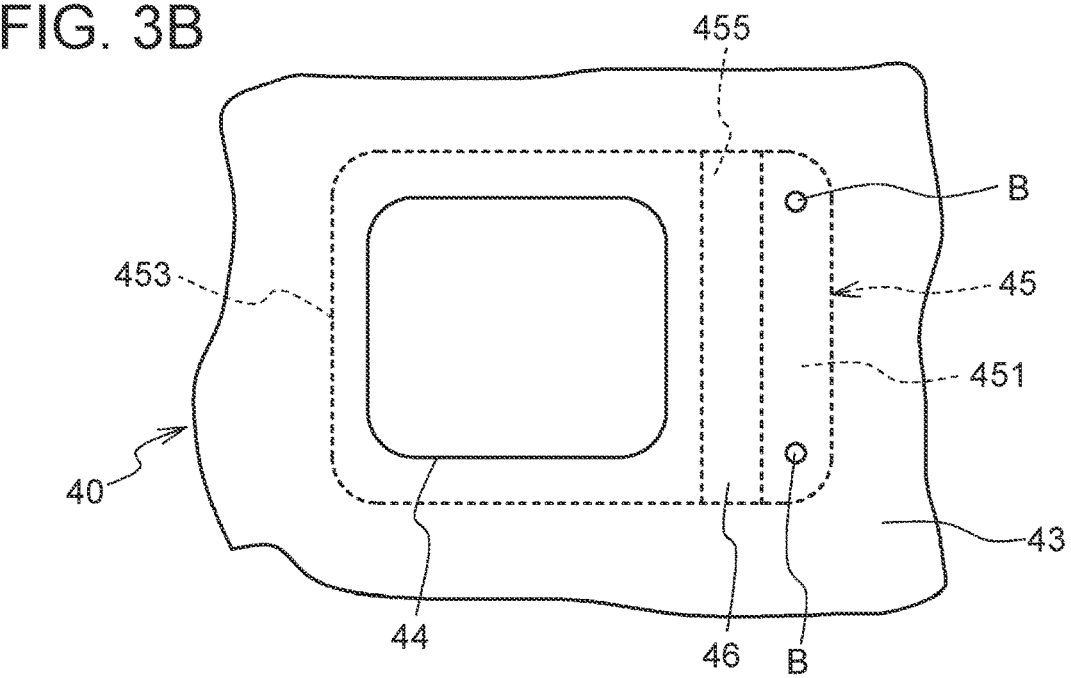
FIG. 3B is a view around the intake reed valve in the closed state as seen from the lower side.
Figure 3C:
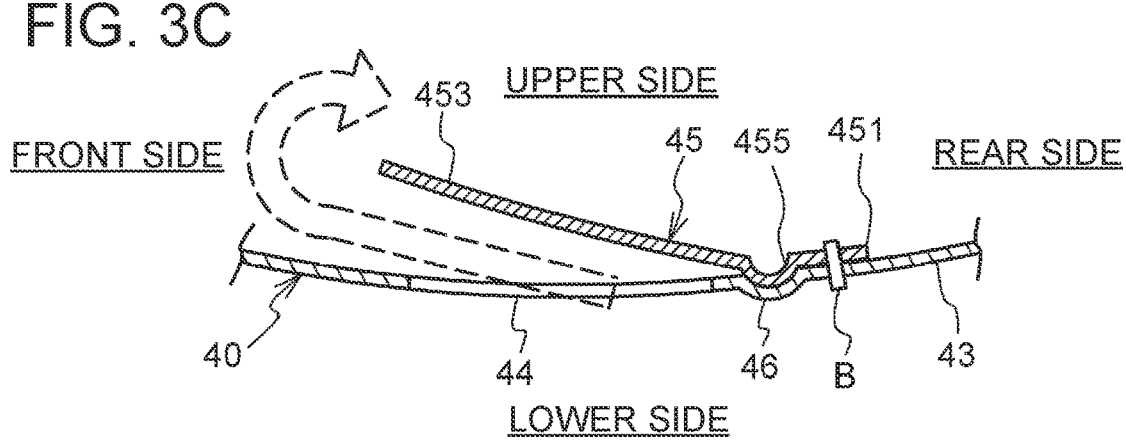
FIG. 3C is a sectional view around the intake reed valve in an open state.

FIG. 3A is a sectional view around the intake reed valve 45 in a closed state. FIG. 3B is a view around the intake reed valve 45 in the closed state as seen from the lower side. FIG. 3C is a sectional view around the intake reed valve 45 in an open state. The intake reed valve 45 is an elastic metal thin-plate member and disposed on the inner surface side of the peripheral wall 43 of the intake duct 40. The intake reed valve 45 has a base end 451, a leading end 453, and a curved part 455. The base end 451 is fixed to the inner surface of the intake duct 40 with fixing members B. For example, the fixing members B are bolts and nuts. Unlike the base end 451, the leading end 453 is a free end that is not fixed to the intake duct 40. Thus, the intake reed valve 45 is supported at one side on the intake duct 40.

The curved part 455 is formed on the side of the base end 451 relative to the second intake inlet 44, and has a semi-cylindrical shape protruding downward toward the outer side of the intake duct 40 and having a central axis extending in the vehicle width direction. The intake duct 40 has a recessed part 46 protruding downward so as to correspond to the curved part 455, and the curved part 455 is supported in the recessed part 46. Here, since the curved part 455 is curved, the intake reed valve 45 is more easily elastically deformable around the central axis of the curved part 455 than in other parts of the intake reed valve 45. The leading end 453 is pressed by the elastic restoring force of the curved part 455 against the inner surface of the intake duct 40, so that the second intake inlet 44 is kept closed.

Here, in a state where the intake shutter valve 60 is open and air is being introduced into the intake duct 40 through the first intake inlet 41, the second intake inlet 44 is kept closed by the elastic restoring force of the intake reed valve 45 itself. By contrast, when the intake shutter valve 60 is closed while the fan F is being driven, the fan F cannot suction air into the intake duct 40 through the first intake inlet 41, so that the pressure inside the intake duct 40 falls in a section between the intake shutter valve 60 and the fuel cell 80. As described above, the second intake inlet 44 and the intake reed valve 45 are provided in this section where the internal pressure falls. Accordingly, when this internal pressure becomes a pressure which is lower than the external pressure, i.e., atmospheric pressure, by a predetermined value or more, the curved part 455 elastically deforms against the elastic restoring force of the intake reed valve 45 itself so that the leading end 453 is separated from the inner surface of the intake duct 40. As a result, the intake reed valve 45 opens toward the inner side of the intake duct 40, and air is suctioned into the intake duct 40 through the second intake inlet 44. In FIG. 3C, the arrow indicates a flow direction of air suctioned into the intake duct 40 through the second intake inlet 44.

As the intake shutter valve 60 that has been closed is opened, the pressure inside the intake duct 40 rises, so that the second intake inlet 44 is closed by the elastic restoring force of the intake reed valve 45. In this way, the intake reed valve 45 functions as a check valve that allows air to flow from the outside to the inside of the intake duct 40 through the second intake inlet 44, but restricts air flow in the reverse direction. As the intake reed valve 45 opens toward the inner side of the intake duct 40, interference with other members disposed around the intake reed valve 45 is prevented.

Next, the second exhaust outlet 54 and the exhaust reed valve 55 will be described. FIG. 4A is a sectional view around the exhaust reed valve 55 in a state where the exhaust reed valve 55 is closed. FIG. 4B is a sectional view around the exhaust reed valve 55 in a state where the exhaust reed valve 55 is open. The exhaust reed valve 55 is a so-called reed valve that is an elastic metal thin-plate member and disposed on the outer surface side of the peripheral wall 53 of the exhaust duct 50. The exhaust reed valve 55 has a base end 551, a leading end 553, and a curved part 555. The base end 551 is fixed to the outer surface of the exhaust duct 50 with fixing members B. Unlike the base end 551, the leading end 553 is a free end that is not fixed to the exhaust duct 50, and thus the exhaust reed valve 55 is supported at one side on the exhaust duct 50.

The curved part 555 is formed on the side of the base end 551 relative to the second exhaust outlet 54, and has a semi-cylindrical shape protruding frontward toward the inner side of the exhaust duct 50 and having a central axis extending in the vehicle width direction. The exhaust duct 50 has a recessed part 56 protruding frontward so as to correspond to the curved part 555, and the curved part 555 is supported in the recessed part 56. Here, since the curved part 555 is curved, the exhaust reed valve 55 is more easily elastically deformable around the central axis of the curved part 555 than in other parts of the exhaust reed valve 55. The leading end 553 is pressed by the elastic restoring force of the curved part 555 against the outer surface of the exhaust duct 50, so that the second exhaust outlet 54 is kept closed.

Here, in a state where the exhaust shutter valve 70 is open and air inside the exhaust shutter valve 70 is being discharged through the first exhaust outlet 51, the second exhaust outlet 54 is kept closed by the elastic restoring force of the exhaust reed valve 55 itself. By contrast, when the exhaust shutter valve 70 is closed while the fan F is being driven, air cannot be discharged through the first exhaust outlet 51, so that the pressure inside the exhaust duct 50 rises in a section between the fuel cell 80 and the exhaust shutter valve 70 on the downstream side relative to the fan F. As described above, the second exhaust outlet 54 and the exhaust reed valve 55 are provided in this section where the internal pressure rises. Therefore, when this internal pressure becomes a pressure which higher than the external pressure, i.e., atmospheric pressure, by a predetermined value or more, the curved part 555 elastically deforms against the elastic restoring force of the exhaust reed valve 55 itself so that the leading end 553 is separated from the outer surface of the exhaust duct 50. As a result, the exhaust reed valve 55 opens toward the outer side of the exhaust duct 50, and air is discharged to the outside of the exhaust duct 50 through the second exhaust outlet 54. In FIG. 4B, the arrow indicates a flow direction of air discharged to the outside of the exhaust duct 50 through the second exhaust outlet 54.

As the exhaust shutter valve 70 that has been closed is opened, the internal pressure of the exhaust duct 50 falls, so that the second exhaust outlet 54 is closed by the elastic restoring force of the exhaust reed valve 55. In this way, the exhaust reed valve 55 functions as a check valve that allows air to flow from the inside to the outside of the exhaust duct 50 through the second exhaust outlet 54, but restricts air flow in the reverse direction.

In a state where the intake shutter valve 60 and the exhaust shutter valve 70 are open, the second intake inlet 44 and the second exhaust outlet 54 are kept closed respectively by the elastic restoring forces of the intake reed valve 45 and the exhaust reed valve 55 themselves. Thus, the number of components is reduced, for example, compared with if urging members are provided that urge the intake reed valve 45 and the exhaust reed valve 55 so that the second intake inlet 44 and the second exhaust outlet 54 are respectively kept closed.

As has been described above, when the intake shutter valve 60 and the exhaust shutter valve 70 are closed while the fan F is being driven, or when the fan F starts to be driven while the intake shutter valve 60 and the exhaust shutter valve 70 are closed, the intake reed valve 45 and the exhaust reed valve 55 open, so that air flows from the second intake inlet 44 through the fuel cell 80 and is discharged through the second exhaust outlet 54. When the intake shutter valve 60 is open and only the exhaust shutter valve 70 is closed while the fan F is being driven, the exhaust reed valve 55 opens while the intake reed valve 45 is kept closed, so that air flows from the first intake inlet 41 of the intake duct 40 through the fuel cell 80 and is discharged through the second exhaust outlet 54. The reason why the flow path of air supplied to the fuel cell 80 is thus switched will be described later.

Figure 5A:
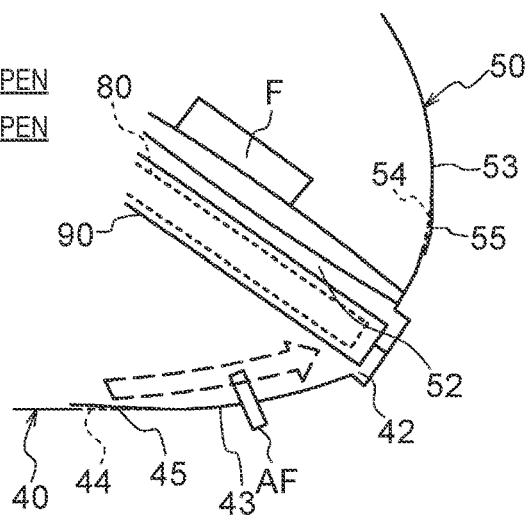
FIG. 5A is an enlarged view around an air flowmeter.
Figure 5B:
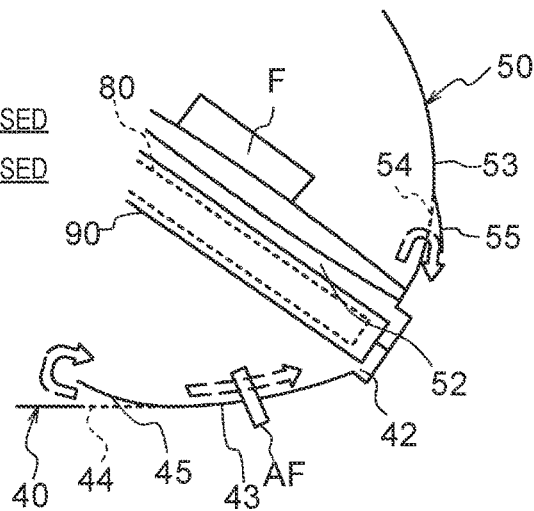
FIG. 5B is an enlarged view around the air flowmeter.
Figure 5C:
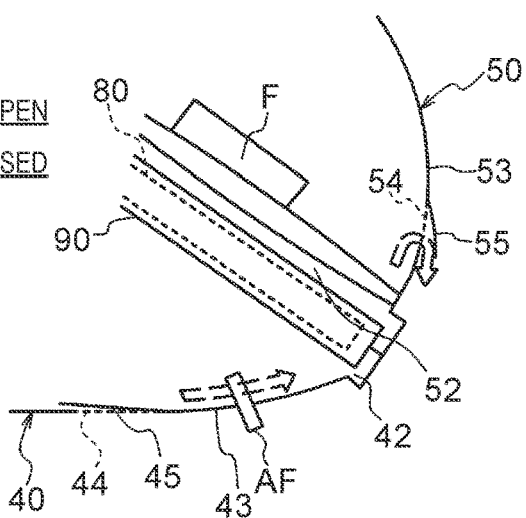
FIG. 5C is an enlarged view around the air flowmeter.

Next, a positional relation between the flow path of air supplied to the fuel cell 80 and the air flowmeter AF will be described. FIG. 5A, FIG. 5B, and FIG. 5C are enlarged views around the air flowmeter AF. In FIG. 5A, the arrow indicates an air flow direction in a state where the fan F is being driven and the intake shutter valve 60 and the exhaust shutter valve 70 are open. In FIG. 5B, the arrows indicate air flow directions in a state where the fan F is being driven, the intake shutter valve 60 and the exhaust shutter valve 70 are closed, and the intake reed valve 45 and the exhaust reed valve 55 are open. In FIG. 5C, the arrows indicate air flow directions in a state where the fan F is being driven, the intake shutter valve 60 and the exhaust reed valve 55 are open, and the intake reed valve 45 and the exhaust shutter valve 70 are closed. The air flowmeter AF is provided at such a position that air flows through the air flowmeter AF in any of the above states. Specifically, the air flowmeter AF is disposed on the lower side of the peripheral wall 43 of the intake duct 40, at a position on the downstream side relative to the second intake inlet 44 and on the upstream side relative to the second exhaust outlet 54 and the fuel cell 80. Thus, the air flowmeter AF can detect the flow rate of air supplied to the fuel cell 80 in any of the above states.

Alternatively, the air flowmeter AF may be provided, for example, in the exhaust duct 50 at a position on the downstream side relative to the fuel cell 80 and on the upstream side relative to the second exhaust outlet 54. In this case, it is desirable that the air flowmeter AF is provided near the second exhaust outlet 54 on the rear side of the peripheral wall 53 of the exhaust duct 50.

Figure 6:
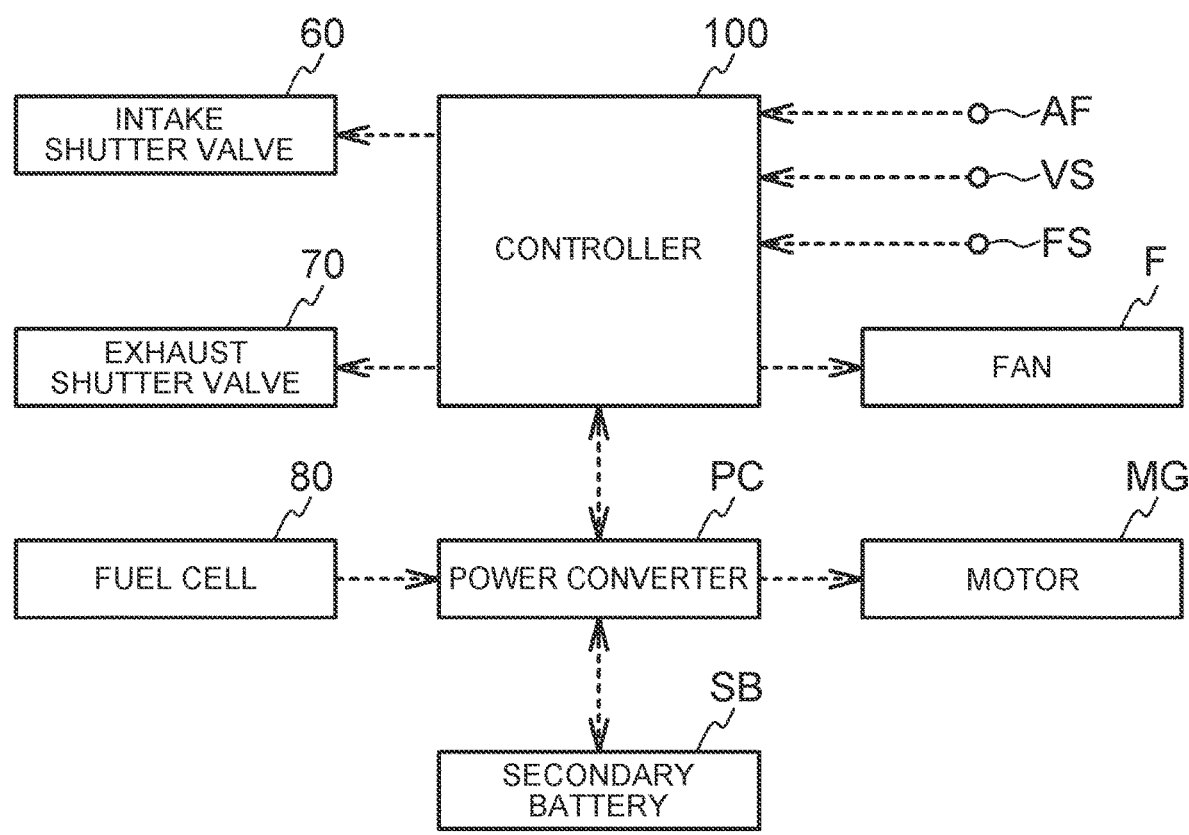
FIG. 6 is a system configuration diagram of the vehicle.

Next, a control system of the vehicle 1 will be briefly described. FIG. 6 is a system configuration diagram of the vehicle 1. A controller 100 is a computer including a central processing unit (CPU), a read only memory (ROM), and a random access memory (RAM). Following a control program stored in the ROM in advance, the controller 100 executes control to be described later on the basis of information from sensors, information stored in the ROM in advance, etc. This control is functionally realized by a stop determination unit, a control unit, a fan driving determination unit, and an air flow rate determination unit that are functionally realized by the CPU, the ROM, and the RAM. Details will be described later.

The controller 100 controls driving of the motor MG by receiving an input from an accelerator position sensor and controlling a power converter PC. The power converter PC includes a fuel cell converter that raises the voltage of electric power supplied from the fuel cell 80, a secondary battery converter that raises the voltage of electric power supplied from a secondary battery SB, and an inverter that converts the electric power at the voltages raised by these converters from direct current to alternating current, and supplies the current to the motor MG and other auxiliaries. For example, according to the amount of electric power stored in the secondary battery SB, the controller 100 makes the vehicle 1 travel by driving the motor MG with electric power generated by the fuel cell 80 or electric power stored in the secondary battery SB. The power converter PC and the secondary battery SB are disposed, for example, on the lower side of a floor panel of the vehicle 1. As will be described in detail later, the controller 100 controls opening and closing of the intake shutter valve 60 and the exhaust shutter valve 70. Output signals from the air flowmeter AF, a vehicle speed sensor VS, a fan rotation speed sensor FS, etc. are output to the controller 100. The vehicle speed sensor VS detects the rotation speed of the drive shaft DS and outputs an output signal indicating the traveling speed of the vehicle 1 to the controller 100. The fan rotation speed sensor FS detects the rotation speed of the fan F and outputs an output signal indicating the rotation speed of the fan to the controller 100.

Next, the reason why the air flow path is switched by switching between opening and closing of the intake shutter valve 60 and the exhaust shutter valve 70 as described above will be described. Even while the vehicle 1 is stopped, the fuel cell 80 may be required to generate electric power to be supplied to auxiliaries etc., or even when the fuel cell 80 is not generating electric power, the fuel cell 80 may be required to be cooled or water inside the fuel cell 80 may be required to be discharged. In such cases, it is necessary to supply air to the fuel cell 80 even while the vehicle is stopped.

It is possible that the vehicle 1 may be washed while being thus stopped. When the vehicle 1 is washed, high-pressure water may enter the intake duct 40 through the ventilation inlet 6a of the body 2, or enter the exhaust duct 50 through the ventilation outlet 4a, and reach the fuel cell 80, affecting the fuel cell 80 in some way. Moreover, this high-pressure water may also affect the fan F disposed inside the exhaust duct 50.

In such an event, the controller 100 closes the intake shutter valve 60 and the exhaust shutter valve 70 as described above. Thus, water can be kept from reaching the fuel cell 80 or the fan F through the intake duct 40 and the exhaust duct 50. Moreover, as the intake shutter valve 60 and the exhaust shutter valve 70 are closed, the intake reed valve 45 and the exhaust reed valve 55 open as shown in FIG. 5B, so that the supply of air to the fuel cell 80 can also be secured. Thus, the fuel cell 80 can generate electric power as well as can be cooled.

As shown in FIG. 1, the second intake inlet 44 is an example of a third opening that is provided at a position between the intake shutter valve 60 and the fuel cell 80, farther away from the ventilation inlets 6a, 6b than the first intake inlet 41 is. Similarly, the second exhaust outlet 54 is an example of a third opening that is provided at a position between the exhaust shutter valve 70 and the fuel cell 80, farther away from the ventilation outlet 4a than the first exhaust outlet 51 is. Thus, even when the intake reed valve 45 and the exhaust reed valve 55 open, water is kept from reaching the second intake inlet 44 or the second exhaust outlet 54 through the ventilation inlets 6a, 6b or the ventilation outlet 4a.

The storage room R communicates with the outside of the vehicle 1 through the ventilation inlets 6a, 6b or a bottom part of the vehicle 1. Thus, even when the intake shutter valve 60 and the exhaust shutter valve 70 are closed, air can be suctioned through the second intake inlet 44 and be discharged to the outside of the storage room R through the second exhaust outlet 54.

Even when the vehicle 1 is traveling, the flow rate of air supplied to the fuel cell 80 may be comparatively low. For example, this refers to a case where the fuel cell 80 is required to generate only a small amount of electric power, for example, when the vehicle is traveling at low speed; a case where the vehicle 1 is traveling using electric power stored in the secondary battery SB, and the fuel cell 80 is not generating electric power but is cooled with air; or a case where water is discharged from inside the fuel cell 80. When the exhaust shutter valve 70 is open when the flow rate of air supplied to the fuel cell 80 is thus low, the flow rate of air discharged from the first exhaust outlet 51 of the exhaust duct 50 to the outside through the ventilation outlet 4a is also low. Here, as shown in FIG. 1, the ventilation outlet 4a is formed in the upper surface of the front hood 4 of the body 2. Therefore, for example, if the flow rate of air discharged through the ventilation outlet 4a is low when the vehicle is traveling in the rain, water trying to enter the ventilation outlet 4a by gravity cannot be blown away and the water may enter the exhaust duct 50. In this case, closing only the exhaust shutter valve 70 as shown in FIG. 5C can secure the supply of air to the fuel cell 80 while keeping water from reaching the fuel cell 80 through the exhaust duct 50 even when the vehicle 1 is traveling.

Figure 7:
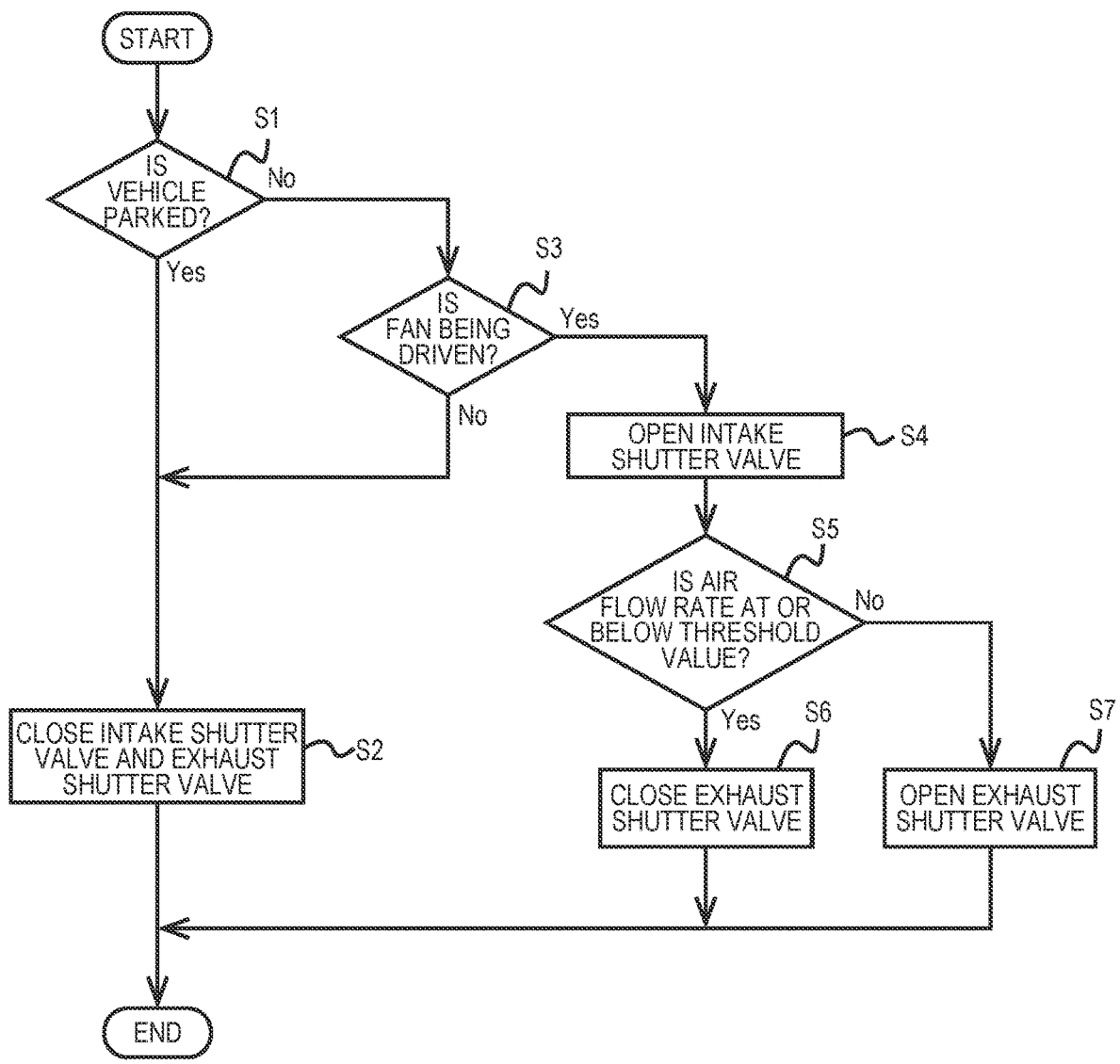
FIG. 7 is a flowchart showing an example of control executed by a controller.

Next, the control executed by the controller 100 will be described. FIG. 7 is a flowchart showing an example of the control executed by the controller 100. This control is executed repeatedly in predetermined cycles.

The controller 100 determines whether the vehicle 1 is stopped, i.e., the vehicle speed is zero, on the basis of an output signal from the vehicle speed sensor VS (step S1). If the determination is affirmative in step S1, the controller 100 closes the intake shutter valve 60 and the exhaust shutter valve 70 (step S2). Step S2 is an example of processing executed by the control unit of blocking communication between the first intake inlet 41 and the fuel cell 80 by the intake shutter valve 60 and blocking communication between the first exhaust outlet 51 and the fuel cell 80 by the exhaust shutter valve 70 when it is determined that the vehicle 1 is stopped. In a case where the fuel cell 80 is required to generate electric power or required to be cooled and the fan F is being driven in this state, the intake reed valve 45 and the exhaust reed valve 55 open as shown in FIG. 5B. Thus, even when the vehicle 1 is washed while being stopped, the supply of air to the fuel cell 80 can be secured while water is kept from reaching the fuel cell 80 through the intake duct 40 and the exhaust duct 50. In a case where the intake shutter valve 60 and the exhaust shutter valve 70 are closed and the fan F is stopped, the intake reed valve 45 and the exhaust reed valve 55 are also kept closed. Thus, even when the vehicle 1 is washed in this state, water can be kept from reaching the fuel cell 80 through the intake duct 40 and the exhaust duct 50.

If the determination is negative in step S1, i.e., the vehicle 1 is traveling, the controller 100 determines whether the fan F is being driven (step S3). Specifically, the controller 100 makes this determination on the basis of the fan rotation speed sensor FS. The processing in step S3 is an example of processing executed by the fan driving determination unit of determining whether the fan F is being driven. If the determination is negative, the controller 100 closes the intake shutter valve 60 and the exhaust shutter valve 70 as described above (step S2). Here, cases where a negative determination is made in step S3 include a case where the fuel cell 80 is not required to generate electric power and the vehicle 1 is traveling on the basis of the secondary battery SB. As the intake shutter valve 60 and the exhaust shutter valve 70 are closed in this case, water can be kept from reaching the fuel cell 80 through the intake duct 40 and the exhaust duct 50 even when the vehicle is traveling in the rain.

If the determination is affirmative in step S3, i.e., the fan F is being driven, the controller 100 opens the intake shutter valve 60 (step S4), and determines whether the flow rate of air supplied to the fuel cell 80 is at or below a threshold value on the basis of an output signal of the air flowmeter AF (step S5). The processing in step S5 is an example of processing executed by the air flow rate determination unit of determining whether a value of a parameter correlated with the flow rate of air supplied to the fuel cell 80 indicates a flow rate of the air at or below the threshold value. As will be described in detail later, this threshold value is an upper limit of a range of the air flow rate beyond which water may enter the exhaust duct 50 through the ventilation outlet 4a when air is discharged through the first exhaust outlet 51 of the exhaust duct 50. This threshold value is acquired through experiment and stored in advance in the ROM of the controller 100.

If the determination is affirmative in step S5, i.e., the flow rate of air supplied to the fuel cell 80 is at or below the threshold value, the controller 100 closes the exhaust shutter valve 70 (step S6). Thus, as shown in FIG. 5C, the supply of air to the fuel cell 80 can be secured while water is kept from reaching the fuel cell 80 through the exhaust duct 50 even when the vehicle 1 is traveling.

If the determination is negative in step S5, i.e., the flow rate of air supplied to the fuel cell 80 is above the threshold value, the controller 100 opens the exhaust shutter valve 70 (step S7). Since the flow rate of air discharged from the ventilation outlet 4a is also high in this case, water can be kept from entering the ventilation outlet 4a. In this case, the intake reed valve 45 and the exhaust reed valve 55 are kept closed as shown in FIG. 5A.

Even when the intake shutter valve 60 does not open due to failure, freezing, etc. or the ventilation inlets 6a, 6b are blocked by snow deposited on the body 2, and thus air cannot be introduced into the intake duct 40, the intake reed valve 45 opens as the fan F is driven. Similarly, even when the exhaust shutter valve 70 does not open or the ventilation outlet 4a is blocked by snow, and thus air cannot be discharged by the exhaust duct 50, the exhaust reed valve 55 opens as the fan F is driven. Thus, the supply of air to the fuel cell 80 can be secured.

As mentioned above, the control shown in FIG. 7 is executed repeatedly in predetermined cycles. Therefore, for example, if the rotation speed of the fan F increases and the air flow rate exceeds the threshold value after the exhaust shutter valve 70 is closed in step S6, a negative determination is made in step S5 that is executed again, so that the exhaust shutter valve 70 is opened in step S7. Conversely, if the speed of the fan F decreases and the air flow rate decreases to or below the threshold value after the exhaust shutter valve 70 is opened, an affirmative determination is made in step S5 that is executed again, so that the exhaust shutter valve 70 is closed in step S6. Thus, the determination in step S5 can be made regardless of whether the exhaust shutter valve 70 is open or closed, because the air flowmeter AF is provided at such a position that air passes through the air flowmeter AF regardless of whether the exhaust shutter valve 70 is open or closed as shown in FIG. 5A and FIG. 5C.

Alternatively, only one of the intake shutter valve 60 and the exhaust shutter valve 70 may be fully closed in step S2. Even in this case, one of the intake reed valve 45 and the exhaust reed valve 55 opens as long as the fan F is being driven, which makes it possible to keep water from reaching the fuel cell 80 through one of the intake duct 40 and the exhaust duct 50 while securing the supply of air to the fuel cell 80. For example, if it is more likely that water enters the exhaust duct 50 than the intake duct 40 while the vehicle is washed, only the exhaust shutter valve 70 may be closed.

In the above embodiment, whether the vehicle is stopped is determined on the basis of the vehicle speed sensor VS, but the present disclosure is not limited to this example. For example, whether the vehicle is stopped may be determined on the basis of at least one of a sensor that detects the rotation speed of the wheels W, a sensor that detects the acceleration of rotation of the drive shaft DS or the wheels W, a sensor that detects the state of a parking brake, etc. In the above embodiment, whether the fan F is being driven is determined on the basis of the fan rotation speed sensor FS, but the present disclosure is not limited to this example. For example, whether the fan F is being driven may be determined on the basis of a sensor that detects whether electric power is being supplied to the fan F.

In the above embodiment, whether the flow rate of air supplied to the fuel cell 80 is at or below the threshold value is determined on the basis of an output signal of the air flowmeter AF that is an example of the parameter correlated with the flow rate of air supplied to the fuel cell 80, but the present disclosure is not limited to this example. For example, this parameter may instead be the accelerator pedal angle. In general, the smaller the accelerator pedal angle, the smaller the amount of electric power required by the motor MG and the smaller the amount of electric power the fuel cell 80 is required to generate. Accordingly, the fan F is controlled to rotate at lower speed so as to reduce the air flow rate. The accelerator pedal angle is detected by a sensor that detects the amount of operation on the accelerator pedal, and is acquired by the controller 100.

Alternatively, the above parameter may be the amount of electric power the fuel cell 80 is required to generate or an output current value of the fuel cell 80. When the amount of electric power the fuel cell 80 is required to generate or the output current value of the fuel cell 80 is smaller, the fan F is controlled to rotate at lower speed so as to reduce the flow rate of air supplied to the fuel cell 80. The amount of electric power the fuel cell 80 is required to generate is calculated and acquired by the controller 100 on the basis of the accelerator pedal angle or the driving state of auxiliaries. The output current value of the fuel cell 80 is detected by a current sensor and acquired by the controller 100.

Alternatively, the above parameter may be the temperature of the fuel cell 80. The lower the temperature of the fuel cell 80, the lower the flow rate of air required to cool the fuel cell 80, and therefore the fan F is controlled to rotate at lower speed. For example, the temperature of the fuel cell 80 can be detected by a temperature sensor that detects the temperature of a metal separator provided near a power generation area of the fuel cell 80. For example, such temperature sensors are provided in the fuel cell 80 near a hydrogen inlet manifold, near a hydrogen outlet manifold, and near a midpoint between the hydrogen inlet manifold and the hydrogen outlet manifold, and the controller 100 calculates and acquires an average value of temperatures detected by these temperature sensors as the temperature of the fuel cell 80.

Alternatively, the above parameter may be the rotation speed of the fan F. The lower the rotation speed of the fan F, the lower the flow rate of air supplied to the fuel cell 80. For example, the rotation speed of the fan F is calculated and acquired by the controller 100 according to the amount of electric power the fuel cell 80 is required to generate, or is acquired by the controller 100 on the basis of a sensor that detects the rotation speed of the fan F.

A plurality of the output value of the air flowmeter AF, the accelerator pedal angle, the amount of electric power the fuel cell 80 is required to generate, the output current value of the fuel cell 80, the temperature of the fuel cell 80, and the rotation speed of the fan F may be used as the above parameter.

Next, a structure for keeping water from entering the intake duct 40 and the exhaust duct 50 through the second intake inlet 44 and the second exhaust outlet 54 while the vehicle is washed will be described. First, the second intake inlet 44 will be described. As shown in FIG. 1 and FIG. 3A to FIG. 3C, the second intake inlet 44 is formed on the lower side of the peripheral wall 43 of the intake duct 40. Therefore, if water enters the storage room R through the ventilation inlet 6a or a gap between the ventilation outlet 4a and the first exhaust outlet 51 while the vehicle is washed, this water may adhere to the upper side of the outer surface of the peripheral wall 43, but is unlikely to adhere to the lower side of the outer surface. Thus, forming the second intake inlet 44 on the lower side of the peripheral wall 43 can keep water from entering the intake duct 40 through the second intake inlet 44. It is desirable that the second intake inlet 44 is formed in the peripheral wall 43 at a position lower than the central axis C4 of the intake duct 40.

As shown in FIG. 3A and FIG. 3C, the leading end 453 of the intake reed valve 45 is located on the front side relative to the base end 451, and the intake reed valve 45 is disposed on the inner side of the intake duct 40. Accordingly, as shown in FIG. 3C, air introduced into the intake duct 40 through the second intake inlet 44 flows mainly along the intake reed valve 45 from the base end 451 toward the leading end 453, i.e., flows in a direction from the rear side toward the front side of the vehicle 1. Therefore, even if water having entered through the ventilation inlet 6a or 6b while the vehicle is stopped adheres to the lower side of the outer surface of the peripheral wall 43 on the front side relative to the second intake inlet 44, this water is kept from running toward the second intake inlet 44 by the air flow from the second intake inlet 44 into the intake duct 40. Thus, water is kept from entering the intake duct 40 through the second intake inlet 44.

As shown in FIG. 1, the motor MG and the transaxle TA are disposed on the lower side of the second intake inlet 44 so as to face the second intake inlet 44. Therefore, even if high-pressure water splashes from a road surface while the vehicle is stopped and washed, water is kept by the motor MG and the transaxle TA from entering the intake duct 40 through the second intake inlet 44.

Next, the second exhaust outlet 54 will be described. As shown in FIG. 1, FIG. 4A, and FIG. 4B, the second exhaust outlet 54 is formed on the rear side of the peripheral wall 53 of the exhaust duct 50, away from the ventilation inlets 6a, 6b that are located at a front-side end of the vehicle 1. Therefore, even if high-pressure water enters the storage room R through the ventilation inlets 6a, 6b while the vehicle is washed, the water is kept from reaching the second exhaust outlet 54. It is desirable that the second exhaust outlet 54 is formed in the peripheral wall 53, at a position on the rear side relative to the central axis C5 of the exhaust duct 50.

As shown in FIG. 4A and FIG. 4B, the exhaust reed valve 55 is disposed on the outer surface side of the peripheral wall 53 of the exhaust duct 50, and the leading end 553 of the exhaust reed valve 55 is located on the lower side relative to the base end 551 and opens toward the outer side of the exhaust duct 50. Therefore, for example, even if water entering through the ventilation outlet 4a while the exhaust reed valve 55 is open and adhering to the upper side of the outer surface of the peripheral wall 53 of the exhaust duct 50 flows to the exhaust reed valve 55, this water flows along the outer surface of the exhaust reed valve 55. Thus, water is kept from entering the exhaust duct 50 through the second exhaust outlet 54.

The open areas of the second intake inlet 44 and the second exhaust outlet 54 are smaller than the open areas of the first intake inlet 41 and the first exhaust outlet 51, respectively. Thus, water is kept from entering the intake duct 40 and the exhaust duct 50 through the second intake inlet 44 and the second exhaust outlet 54, respectively.

Next, other examples of the second intake valve and the second exhaust valve will be described. In these other examples, similar reference signs will be used to omit an overlapping description. First, an intake flap valve 45a will be described. FIG. 8A is a sectional view around the intake flap valve 45a of a modified example in an open state. FIG. 8B is a view around the intake flap valve 45a of the modified example in a closed state as seen from the lower side. A shaft 47 extending in the vehicle width direction is disposed on the inner surface of the peripheral wall 43 of an intake duct 40a, and both ends of the shaft 47 are fixed with saddle bands 48 that are fixing brackets. The peripheral wall 43 has a recessed part 46 protruding downward so as to correspond to the shaft 47. A base end 451a of the intake flap valve 45a is curved so as to be wound around the shaft 47. Thus, the intake flap valve 45a is supported so as to be swingable around the shaft 47.

As shown in FIG. 8B, a cutout 457a is formed in a center part of the base end 451a, and a spring Sa is wound around a part of the shaft 47 exposed through the cutout 457a. The spring Sa is a helical torsion spring. One end of the spring Sa is in contact with the inner surface of the peripheral wall 43, while the other end of the spring Sa is in contact with the intake flap valve 45a, and an urging force is applied by the spring Sa from the outside to the intake flap valve 45a so that the intake flap valve 45a is kept closed. Thus, when the intake shutter valve 60 is closed and the fan F is being driven, the pressure inside the intake duct 40a falls, so that the intake flap valve 45a opens against the urging force of the spring Sa. Thus, in this example, too, it is possible to secure the supply of air to the fuel cell 80 while keeping water from reaching the fuel cell 80 through the intake duct 40a by closing the intake shutter valve 60.

FIG. 8C is a sectional view around an exhaust flap valve 55a of the modified example in an open state. As with the intake flap valve 45a, a base end 551a of the exhaust flap valve 55a is curved so as to be wound around a shaft 57 fixed to the outer surface of the peripheral wall 53 of an exhaust duct 50a, and the exhaust flap valve 55a is supported so as to be swingable around the shaft 57. An urging force is applied by the spring Sa from the outside to the exhaust flap valve 55a so that the exhaust flap valve 55a is kept closed. Thus, when the exhaust shutter valve 70 is closed and the fan F is being driven, the pressure inside the exhaust duct 50a rises, so that the exhaust flap valve 55a opens against the urging force of the spring Sa. Thus, in this embodiment, too, it is possible to secure the supply of air to the fuel cell 80 while keeping water from reaching the fuel cell 80 through the exhaust duct 50a by closing the exhaust shutter valve 70.

Figure 9C:
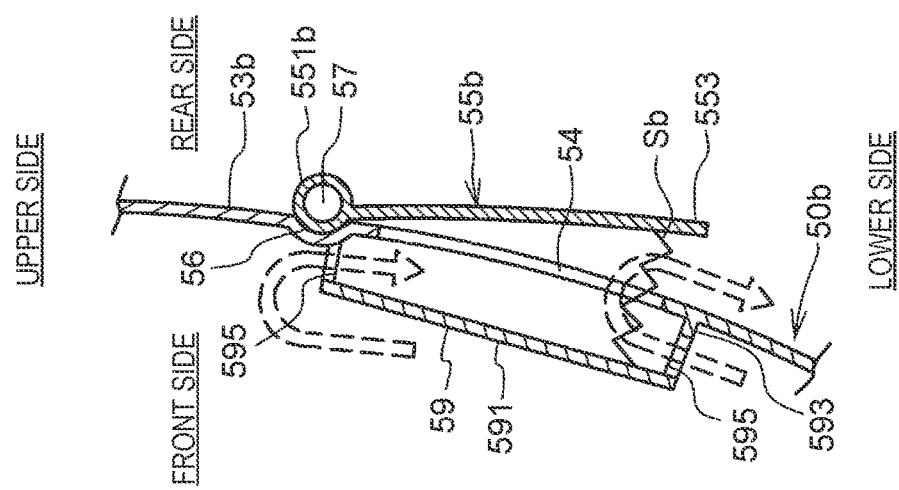
FIG. 9C is a sectional view around an exhaust flap valve of the modified example in an open state.
Figure 9A:
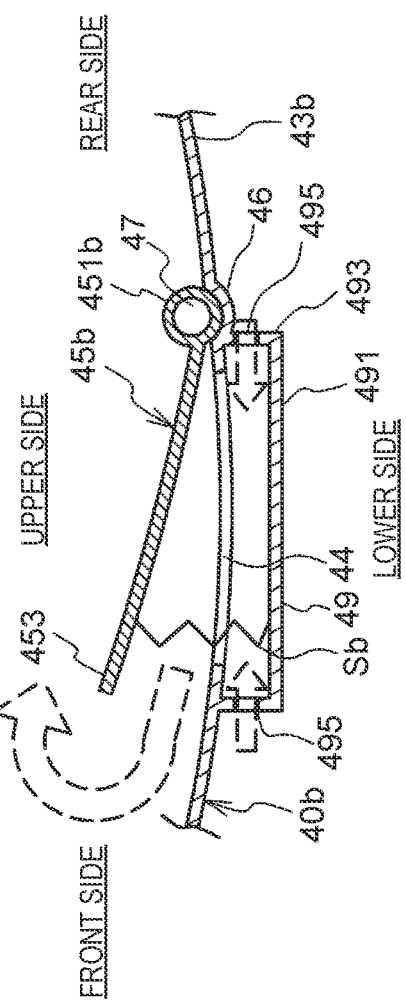
FIG. 9A is a sectional view around an intake flap valve of a modified example in an open state.
Figure 9B:
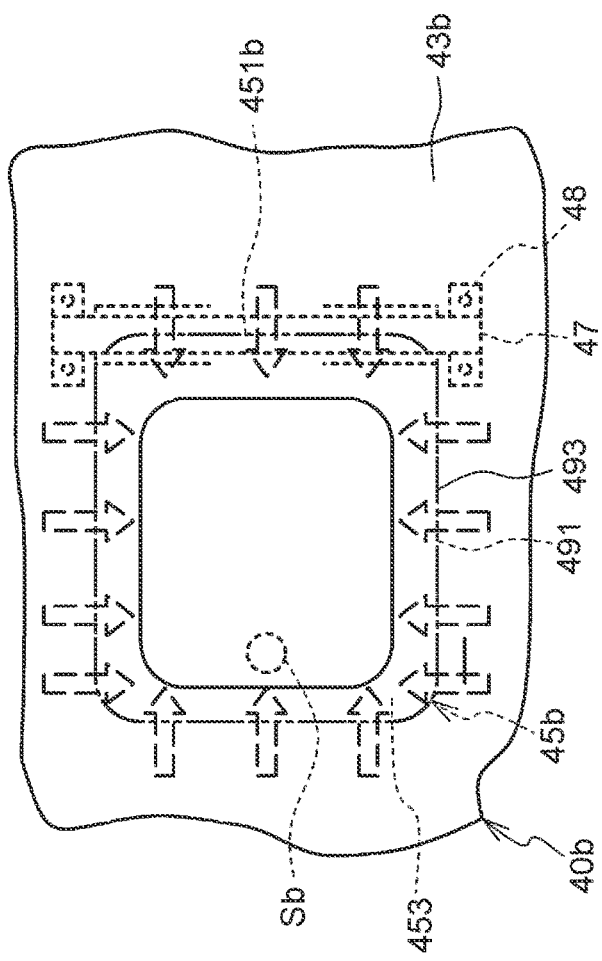
FIG. 9B is a view around the intake flap valve of the modified example in a closed state as seen from the lower side.

FIG. 9A is a sectional view around an intake flap valve 45b of a modified example in an open state. FIG. 9B is a view around the intake flap valve 45b of the modified example in a closed state as seen from the lower side. A base end 451b of the intake flap valve 45b is supported so as to be swingable around the shaft 47. A housing 49 is formed around the second intake inlet 44 of an intake duct 40b so as to protrude toward the outer side from a peripheral wall 43b of the intake duct 40b and cover the second intake inlet 44 from the outer side. The housing 49 has a side wall 493 protruding from the lower side of the peripheral wall 43b so as to surround the second intake inlet 44, and a lower bottom part 491 continuous from a leading end of the side wall 493 so as to block an opening at the leading end. As shown in FIG. 9B, the side wall 493 has a substantially rectangular shape as seen from the lower side.

A spring Sb is disposed between the housing 49 and the intake flap valve 45b. The spring Sb is a helical extension spring. One end of the spring Sb is fixed to the inner side of the lower bottom part 491, while the other end of the spring Sb is fixed to the intake flap valve 45b on the side of the leading end 453, and an urging force is applied by the spring Sb from the outside to the intake flap valve 45b so that the intake flap valve 45b is kept closed. A plurality of ventilation holes 495 are formed in the side wall 493. In this example, too, when the intake shutter valve 60 is closed and the fan F is being driven, the pressure inside the intake duct 40b falls, so that the spring Sb extends against the urging force of the spring Sb and opens the intake flap valve 45b. As a result, air outside the intake duct 40b flows through the second intake inlet 44 from the ventilation holes 495 and is introduced into the intake duct 40b. Since the second intake inlet 44 is covered by the housing 49 from the outer side, water is kept from entering the intake duct 40b through the second intake inlet 44.

FIG. 9C is a sectional view around an exhaust flap valve 55b of the modified example in an open state. A base end 551b of the exhaust flap valve 55b is supported so as to be swingable around the shaft 57. A housing 59 is formed around the second exhaust outlet 54 of an exhaust duct 50b so as to protrude toward the inner side from a peripheral wall 53b of the exhaust duct 50b and cover the second exhaust outlet 54 from the inner side. The housing 59 has a side wall 593 protruding from an inner surface of the peripheral wall 53b so as to surround the second exhaust outlet 54, and a lower bottom part 591 continuous from a leading end of the side wall 593 so as to block an opening at the leading end.

One end of the spring Sb is fixed to the inner side of the lower bottom part 591, while the other end of the spring Sb is fixed to the leading end 553 of the exhaust flap valve 55b, and an urging force is applied by the spring Sb from the outside to the exhaust flap valve 55b so that the exhaust flap valve 55b is kept closed. A plurality of ventilation holes 595 are formed in the side wall 593. When the exhaust shutter valve 70 is closed and the fan F is being driven, the pressure inside the exhaust duct 50b rises, so that the spring Sb extends against the urging force of the spring Sb and opens the exhaust flap valve 55b. As a result, air inside the exhaust duct 50b flows through the second exhaust outlet 54 from the ventilation holes 595 and is discharged to the outside of the exhaust duct 50b.

FIG. 10A is a sectional view around an intake lift valve 45c of a modified example in an open state. FIG. 10B is a view around the intake lift valve 45c of the modified example in a closed state as seen from the lower side. The intake lift valve 45c is not fixed to an intake duct 40c, and is housed inside a housing 49c. The housing 49c is formed so as to protrude toward the inner side from a peripheral wall 43c of the intake duct 40c and cover a second intake inlet 44c. The housing 49c has a substantially cylindrical side wall 493c protruding from the inner side of the peripheral wall 43c so as to surround the second intake inlet 44c, and an upper bottom part 491c continuous from an upper end of the side wall 493c so as to block an opening at the upper end. The second intake inlet 44c has a substantially circular shape that corresponds to the substantially cylindrical side wall 493c, and the intake lift valve 45c has a substantially discoid shape so as to slide along an inner surface of the side wall 493c.

A spring Sc is a helical compression spring disposed between the housing 49c and the intake lift valve 45c. One end of the spring Sc is fixed to the inner side of the upper bottom part 491c, while the other end of the spring Sc is fixed to the intake lift valve 45c, and an urging force is applied by the spring Sc from the outside to the intake lift valve 45c so that the intake lift valve 45c is kept closed. A plurality of ventilation holes 495c are formed in the side wall 493c. In this example, too, when the intake shutter valve 60 is closed and the fan F is being driven, the pressure inside the intake duct 40c falls, so that the spring Sc contracts against the urging force of the spring Sc and opens the intake lift valve 45c. As a result, air outside the intake duct 40c flows through the ventilation holes 495c from the second intake inlet 44c and is introduced into the intake duct 40c.

FIG. 10C is a sectional view around an exhaust lift valve 55c of the modified example in an open state. The exhaust lift valve 55c is not fixed to an exhaust duct 50c, and is housed inside a housing 59c. The housing 59c is formed so as to protrude toward the outer side from a peripheral wall 53c of the exhaust duct 50c and cover a second exhaust outlet 54c from the outer side. The housing 59c has a substantially cylindrical side wall 593c surrounding the second exhaust outlet 54c, and an upper bottom part 591c continuous from a leading end of the side wall 593c.

One end of the spring Sc is fixed to the inner side of the upper bottom part 591c, while the other end of the spring Sc is fixed to the exhaust lift valve 55c, and an urging force is applied by the spring Sc from the outside to the exhaust lift valve 55c so that the exhaust lift valve 55c is kept closed. A plurality of ventilation holes 595c are formed in the side wall 593c. In this modified example, too, when the exhaust shutter valve 70 is closed and the fan F is being driven, the pressure inside the exhaust duct 50c rises, so that the spring Sc contracts against the urging force of the spring Sc and opens the exhaust lift valve 55c. As a result, air inside the exhaust duct 50c flows through the second exhaust outlet 54c and is discharged to the outside of the exhaust duct 50c through the ventilation holes 595c. Since the second exhaust outlet 54c is covered by the housing 59c from the outer side, water is kept from entering the exhaust duct 50c through the second exhaust outlet 54c.

While the embodiment of the present disclosure has been described in detail above, the present disclosure is not limited to this specific embodiment, and various modifications and changes can be made within the scope of the gist of the disclosure described in the claims.

In the above embodiment, both the intake duct 40 and the exhaust duct 50 and both the intake shutter valve 60 and the exhaust shutter valve 70 are provided, but the present disclosure is not limited to this example. For example, in a case where the exhaust duct 50 is not provided, at least the intake duct 40, the second intake inlet 44, the intake reed valve 45, and the intake shutter valve 60 should be provided. In a case where the intake duct 40 is not provided, at least the exhaust duct 50, the second exhaust outlet 54, the exhaust reed valve 55, and the exhaust shutter valve 70 should be provided. In a case where both the intake duct 40 and the exhaust duct 50 are provided but the intake shutter valve 60 is not provided, at least the second exhaust outlet 54, the exhaust reed valve 55, and the exhaust shutter valve 70 should be provided. In a case where both the intake duct 40 and the exhaust duct 50 are provided but the exhaust shutter valve 70 is not provided, at least the second intake inlet 44, the intake reed valve 45, and the intake shutter valve 60 should be provided.

Instead of the intake reed valve 45 etc., a solenoid valve of which opening and closing is controlled by the controller 100 may be provided. In this case, the controller 100 can open the solenoid valve when the fan F is being driven and the intake shutter valve 60 blocks communication between the first intake inlet 41 and the fuel cell 80. Similarly, a solenoid valve may be provided instead of the exhaust reed valve 55 etc.

In the above embodiment, when the vehicle is not stopped and the fan F is being driven, opening and closing of the exhaust shutter valve 70 is switched according to the flow rate of air supplied to the fuel cell 80, as shown in steps S1, S3, S5, S6, S7 of FIG. 7, but the present disclosure is not limited to this example. Specifically, when the vehicle is stopped and the fan F is being driven, both the intake shutter valve 60 and the exhaust shutter valve 70 may be opened.

The position of the fan F is not limited to that in the above embodiment. For example, the fan F may be disposed between the second intake inlet 44 and the fuel cell 80. In this case, the second intake inlet 44, the fan F, and the fuel cell 80 are arranged in this order in a direction from the first intake inlet 41 toward the intake outlet 42 of the intake duct 40, and the second exhaust outlet 54, the fuel cell 80, and the fan F are arranged in this order in a direction from the first exhaust outlet 51 toward the exhaust inlet 52 of the exhaust duct 50. In this case, too, when the intake shutter valve 60 and the exhaust shutter valve 70 are closed and the fan F is being driven, air can be supplied to the fuel cell 80 through the second intake inlet 44 and the second exhaust outlet 54.

In the above embodiment, the fan suctions air from the front side and discharges the air to the rear side, but the present disclosure is not limited to this example. For example, the fan may suction air from the rear side and discharge the air to the front side.

What is claimed is:

1. An air-cooled fuel cell vehicle equipped with an air-cooled fuel cell, the vehicle comprising:
    a traction motor that is supplied with electric power generated by the fuel cell;
    a duct that has a first opening, a second opening facing the fuel cell, and a peripheral wall connecting the first opening to the second opening;
    a fan that circulates air through the duct;
    a first valve that allows or blocks communication between the first opening and the fuel cell;
    a body that has a ventilation port facing the first opening, and houses the fuel cell, the duct, the fan, and the first valve;
    a stop determination unit that determines whether the vehicle is stopped; and
    a control unit that controls the first valve, wherein
    the peripheral wall is provided with a third opening at a position between the first valve and the fuel cell, farther away from the ventilation port than the first opening is, and with a second valve that opens and closes the third opening,
    the third opening, the fuel cell, and the fan, or the third opening, the fan, and the fuel cell, are arranged in this order in a direction from the first opening toward the second opening,
    when it is determined that the vehicle is stopped, the control unit blocks communication between the first opening and the fuel cell by the first valve, and
    when the fan is being driven and communication between the first opening and the fuel cell is blocked by the first valve, the second valve opens the third opening.

2. The air-cooled fuel cell vehicle according to claim 1, wherein
    the body includes, as the ventilation port, a ventilation outlet through which air is discharged from the body,
    the duct includes an exhaust duct that guides air, discharged from the fuel cell, to the ventilation outlet,
    the duct includes a first exhaust outlet as the first opening,
    the duct includes an exhaust inlet as the second opening,
    the first valve includes a first exhaust valve that allows or blocks communication between the first exhaust outlet and the fuel cell,
    the peripheral wall of the exhaust duct is provided with a second exhaust outlet as the third opening, and
    the second valve includes a second exhaust valve that opens and closes the second exhaust outlet.

3. The air-cooled fuel cell vehicle according to claim 2, wherein
    the duct includes, as a second ventilation port, a ventilation inlet though which the air is introduced into the body,
    the ventilation inlet is located on a front side of the vehicle, and
    the second exhaust outlet is provided on a side of the peripheral wall of the exhaust duct that is closer to a rear side of the vehicle.

4. The air-cooled fuel cell vehicle according to claim 2, further comprising:

a fan driving determination unit that determines whether the fan is being driven; and an air flow rate determination unit that determines whether a value of a parameter correlated with a flow rate of air supplied to the fuel cell indicates a value of the flow rate of the air at or below a threshold value, wherein the ventilation outlet is provided in an upper surface of the body, and when it is determined that the vehicle is not stopped, that the fan is being driven, and that the value of the parameter indicates the flow rate of the air at or below the threshold value, the control unit blocks communication between the first exhaust outlet and the fuel cell by the first exhaust valve.

5. The air-cooled fuel cell vehicle according to claim 2, wherein the second exhaust valve is disposed on an outer surface side of the exhaust duct, the second exhaust valve closes the second exhaust outlet by an elastic restoring force of the second exhaust valve itself or by an urging force applied from an outside to the second exhaust valve, and when a pressure inside the exhaust duct becomes a pressure which is higher than a pressure outside the exhaust duct by a predetermined value or more, the second exhaust valve opens the second exhaust outlet against the elastic restoring force or the urging force.

6. The air-cooled fuel cell vehicle according to claim 2, wherein the second exhaust valve has a base end part that is supported on an outer surface side of the exhaust duct, and a leading end part that is a free end located on a lower side relative to the base end part.

7. The air-cooled fuel cell vehicle according to claim 1, wherein the body includes, as the ventilation port, a ventilation inlet through which air is introduced into the body, the duct includes an intake duct that guides air, introduced into the body through the ventilation inlet, to the fuel cell, the duct includes a first intake inlet as the first opening, the duct includes an intake outlet as the second opening, the first valve includes a first intake valve that allows or blocks communication between the first intake inlet and the fuel cell, the peripheral wall of the intake duct is provided with a second intake inlet as the third opening, and the second valve includes a second intake valve that opens and closes the second intake inlet.

8. The air-cooled fuel cell vehicle according to claim 7, wherein the second intake inlet is located on a lower side of the intake duct.

9. The air-cooled fuel cell vehicle according to claim 8, wherein the motor, or a transaxle that transmits power of the motor to wheels, is disposed on a lower side of the second intake inlet.

10. The air-cooled fuel cell vehicle according to claim 7, wherein the second intake valve is disposed on an inner surface side of the intake duct, the second intake valve closes the second intake inlet by an elastic restoring force of the second intake valve itself or by an urging force applied from an outside to the second intake valve, and when a pressure inside the intake duct becomes a pressure which is lower than a pressure outside the intake duct by a predetermined value or more, the second intake valve opens the second intake inlet against the elastic restoring force or the urging force.

11. The air-cooled fuel cell vehicle according to claim 7, wherein the second intake valve has a base end part that is supported on an inner surface side of the intake duct, and a leading end part that is a free end located on a front side of the vehicle relative to the base end part.

12. The air-cooled fuel cell vehicle according to claim 1, wherein an open area of the third opening is smaller than an open area of the first opening of the duct.

13. An air-cooled fuel cell vehicle equipped with an air-cooled fuel cell, the vehicle comprising:

a traction motor that is supplied with electric power generated by the fuel cell;

a duct that has a first opening, a second opening facing the fuel cell, and a peripheral wall connecting the first opening to the second opening;

a fan that circulates air through the duct;

a first valve that allows or blocks communication between the first opening and the fuel cell;

a body that has a ventilation port facing the first opening, and houses the fuel cell, the duct, the fan, and the first valve; and an electronic control unit programmed to determine whether the vehicle is stopped and to control the first valve, wherein the peripheral wall is provided with a third opening at a position between the first valve and the fuel cell, farther away from the ventilation port than the first opening is, and with a second valve that opens and closes the third opening, the third opening, the fuel cell, and the fan, or the third opening, the fan, and the fuel cell, are arranged in this order in a direction from the first opening toward the second opening, when it is determined that the vehicle is stopped, the electronic control unit is programmed to drive the first valve so as to block communication between the first opening and the fuel cell, and when the fan is being driven and communication between the first opening and the fuel cell is blocked by the first valve, the second valve opens the third opening.

* * * * *